United States Patent
Aoyama et al.

(10) Patent No.: US 8,338,738 B2
(45) Date of Patent: Dec. 25, 2012

(54) METHOD OF WELDING PROJECTION BOLT AND WELDING APPARATUS

(75) Inventors: Yoshitaka Aoyama, Sakai (JP); Shoji Aoyama, Sakai (JP)

(73) Assignee: Yoshitaka Aoyama, Osaka (JP)

( * ) Notice: Subject to any disclaimer, the term of this patent is extended or adjusted under 35 U.S.C. 154(b) by 658 days.

(21) Appl. No.: 12/528,335

(22) PCT Filed: Feb. 19, 2008

(86) PCT No.: PCT/JP2008/052750
§ 371 (c)(1),
(2), (4) Date: Aug. 24, 2009

(87) PCT Pub. No.: WO2008/108165
PCT Pub. Date: Sep. 12, 2008

(65) Prior Publication Data
US 2010/0059486 A1      Mar. 11, 2010

(30) Foreign Application Priority Data

Mar. 2, 2007  (JP) .................. 2007-094398
Mar. 2, 2007  (JP) .................. 2007-094399
Mar. 2, 2007  (JP) .................. 2007-094400
Sep. 18, 2007 (WO) ............. PCT/JP2007/068090
Dec. 26, 2007 (JP) .................. 2007-341968
Dec. 26, 2007 (JP) .................. 2007-341969

(51) Int. Cl.
    *B23K 11/10*       (2006.01)

(52) U.S. Cl. ........ 219/91.2; 219/80; 219/86.1; 219/91.1

(58) Field of Classification Search ............... 219/78.01, 219/79, 80, 86.1, 86.23–25, 86.33, 86.41–47, 219/91.1, 91.2, 93, 136
See application file for complete search history.

(56) References Cited

U.S. PATENT DOCUMENTS

| | | | | |
|---|---|---|---|---|
| 4,754,116 | A * | 6/1988 | Naruse et al. | 219/78.01 |
| 5,359,171 | A | 10/1994 | Aoyama | |
| 2003/0039532 | A1 * | 2/2003 | Aoyama et al. | 414/27 |
| 2003/0127432 | A1 * | 7/2003 | Aoyama et al. | 219/93 |

FOREIGN PATENT DOCUMENTS

| | | |
|---|---|---|
| JP | 2509103 | 9/1992 |
| JP | 06-226459 | 8/1994 |
| JP | 06-344151 | 12/1994 |

(Continued)

OTHER PUBLICATIONS

International Preliminary Report on Patentability and Written Opinion of International Searching Authority mailed Sep. 17, 2009 for International Application No. PCT/JP2008/052750.

(Continued)

*Primary Examiner* — Tucker Wright
(74) *Attorney, Agent, or Firm* — Wenderoth, Lind & Ponack, L.L.P.

(57) ABSTRACT

An apparatus for welding a projection bolt includes a control unit which outputs an actuating signal for an advancing pressurizing means in response to at least a signal indicating completion of insertion of the projection bolt into a receiving hole and a signal indicating completion of movement of a steel plate part. Electrodes are provided for welding the projection bolt, and advancement of the electrodes from a retracted state is started in response to the actuating signal.

17 Claims, 8 Drawing Sheets

FOREIGN PATENT DOCUMENTS

| | | |
|---|---|---|
| JP | 07-228337 | 8/1995 |
| JP | 07-328773 | 12/1995 |
| JP | 09-057458 | 3/1997 |
| JP | 2003-236672 | 8/2003 |
| JP | 2007-167947 | 7/2007 |

OTHER PUBLICATIONS

International Search Report dated May 20, 2008 for International Application No. PCT/JP2008/052750.

\* cited by examiner

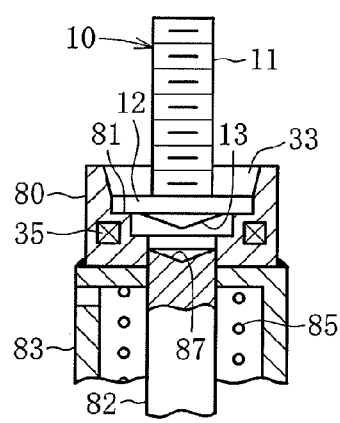
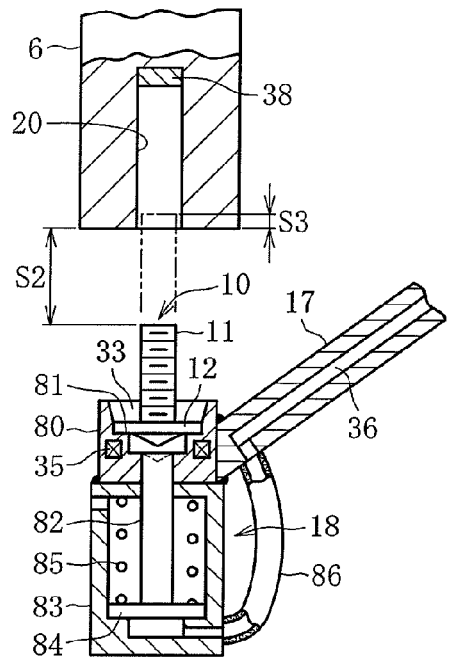
FIG. 10B  FIG. 10A
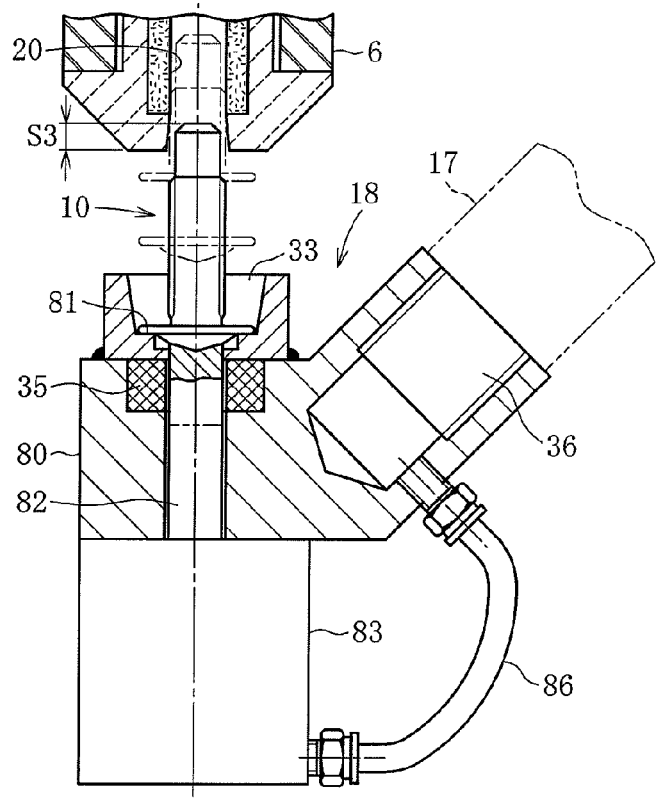
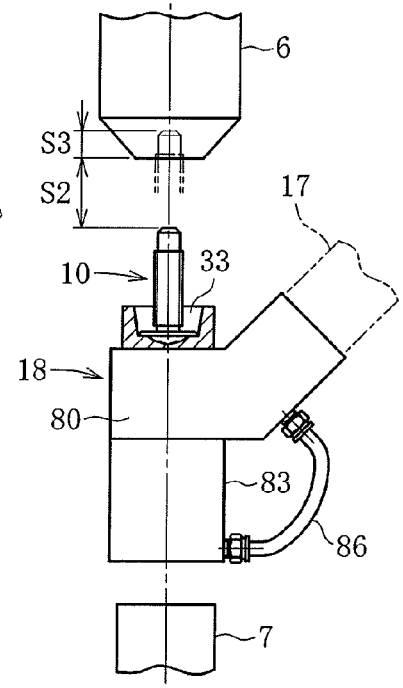
FIG. 11A  FIG. 11B

METHOD OF WELDING PROJECTION BOLT AND WELDING APPARATUS

TECHNICAL FIELD

This invention relates to welding of a projection bolt to a steel plate part by electric resistance welding.

BACKGROUND ART

Japanese Patent No. 2509103 discloses a technology of inserting a projection bolt held by a holding head of an advancing-retracting feed rod into a receiving hole provided in an electric resistance welding electrode, and then advancing the electrode to weld the projection bolt to the steel plate part on standby. Japanese Patent Application Laid-Open No. Hei. 9-57458 discloses a technology in which the action of moving a steel plate part clamped on a robot device is synchronized with the action of feeding a projection nut to an electrode. Japanese Patent Application Laid-Open No. 2003-236672 discloses a technology of advancing an electrode in response to a signal obtained when a feed rod is located at a predetermined position on its return stroke and then carrying out pressurization and energization.
[Patent Document 1] Japanese Patent No. 2509103.
[Patent Document 2] Japanese Patent Application Laid-Open No. Hei. 09-57458.
[Patent Document 3] Japanese Patent Application Laid-Open No. 2003-236672.

DISCLOSURE OF THE INVENTION

Problems to be Solved by the Invention

A first noteworthy point in the technologies disclosed in the above Patent Documents is that the action of advancing the electrode toward the steel plate part is not organically linked to the actions of other moving members. Therefore, further improvement is required to make the actions smooth. In particular, when the steel plate part has a plurality of welding points for the projection bolts, the distance between the first and second welding points, for example, may be small, but the distance between the second and third welding points may be large. If the distances between the welding points are different as described above, the advancing timing of the electrode must be changed according to different distances.

A second noteworthy point is as follows. In the above-described welding apparatus and method, the action of transferring the projection bolt onto a position on the axial line of the electrode at a high speed can be easily carried out using an air cylinder or the like since the transfer distance is relatively large. However, in order to insert the end portion of the projection bolt into the receiving hole and then apply an air blast to complete the insertion, the holding head must be moved finely and accurately. More specifically, the holding head must be accurately moved a short distance at a high speed.

However, if a mechanically movable sensor component such as a limit switch is used to accurately move the holding head a short distance at a high speed, the following problems arise. The attachment position of the sensor component can be displaced, so that the stop position of the holding head is changed. Therefore, unfortunately, the movement of the holding head can be stopped before the end portion of the projection bolt is inserted into the receiving hole. Moreover, when the feed rod and the holding head are moved, their stop positions are, unfortunately, not easily controlled due to their inertial forces, which is not preferable in terms of achieving fine movement. When the amount of the movement of the holding head is small, the sensor components must be arranged at small intervals. Therefore, restrictions are imposed on the installation space, and structural difficulties arise. In addition, if the sensor components are mechanically movable, their movable parts are subjected to temporal change such as wear. Therefore, the sensor components require replacement and adjustment of their moving positions, which is not preferable from the viewpoint of maintenance.

A third noteworthy point in the technologies disclosed in the above Patent Documents is such that mutual relations are not established in a rational manner between a feed control unit for feeding projection bolts one-by-one, a stopper unit for alleviating an impact of a projection bolt transferred through a feed passage at a fast speed, and the advanced and retracted positions of the feed rod.

The present invention has been provided to solve the foregoing problems. It is a first object of the present invention to provide a method and an apparatus for welding a projection bolt in which the advancement of an electrode can be appropriately started based on the action of positioning a welding point on a steel plate part to which the projection bolt is to be welded and on the state of completion of feeding of the projection bolt to an electrode.

A second object is to provide a method and an apparatus for welding a projection bolt in which the feeding accuracy of the projection bolt can be improved by applying an air blast at correct timing using a timer unit.

A third object is to provide an apparatus for welding a projection bolt in which is capable of organically linking the advanced and retracted positions of a feed rod to the stop-pass of a projection bolt transferred through a feeding passage by an air blast at-through a stopper unit.

Means for Solving the Problems

One aspect of this invention is provided to solve the foregoing problems and is a method of welding a projection bolt as one embodiment.
More specifically, the method comprises: inserting an end portion of a projection bolt held by a holding head of an advancing-retracting feed rod into a receiving hole of an electrode by means of an advancing action of insertion driving means when the feed rod is located at an advanced position; applying a pushing-out force from the holding head to the projection bolt held at an insertion position to complete insertion of the projection bolt into the receiving hole; retracting the feed rod; and then advancing the electrode to weld the projection bolt to a steel plate part on standby by electric resistance welding. In this method, the electrode is advanced toward the steel plate part in response to a signal generated upon the insertion of the projection bolt into the receiving hole and a signal generated when a welding point on the steel sheet part to which the projection bolt is to be welded is aligned with the electrode, and then pressurization and energization are carried out.

Effects of the Invention

As described above, since the signal generated upon the insertion of the projection bolt into the receiving hole is used, even if an abnormal situation occurs in which the projection bolt is not inserted into the receiving hole of the electrode for some reason, the electrode is not accidentally advanced.

Therefore, an effective preventive measure against miss feeding of the projection bolt is taken.

Moreover, as described above, since the signal generated when the welding point on the steel plate part to which the projection bolt is to be welded is aligned with the electrode is used, the electrode can be reliably advanced at appropriate timing even when there are variations in the time required until the welding point is aligned with the electrode. Therefore, even when the steel plate part is moved forward, backward, left, or right or turned upside down by the robot device, the electrode can be reliably advanced irrespective of variations in the time required for the above movements. In other words, even when the distance from a first welding point to a second welding point is short but the distance between the second welding point to a third welding point is long, the advancement of the electrode is appropriately started.

In the method of welding a projection bolt, an action of inserting the projection bolt into the receiving hole and an action of aligning the welding point with the electrode may be performed in an overlapping manner.

Since the action of inserting the projection bolt into the receiving hole, i.e., the time period required until the feed rod is advanced to insert the projection bolt held thereby into the receiving hole overlaps the time period required to align the welding point with the electrode, the insertion of the bolt and the movement of the steel plate part are carried out in an overlapping manner. This is effective to reduce the time required for welding. In particular, since the action of inserting the projection bolt into the receiving hole and the movement of the steel plate part are carried out in an overlapping manner, the maximum required time is a longer one of the time required to feed the bolt to the electrode and the time required to move the steel plate. Therefore, a situation in which the maximum required time is given as the sum of these times can be avoided.

Desirably, in the method of welding a projection bolt, the signal generated upon the insertion of the projection bolt into the receiving hole is a signal obtained when the feed rod is located at a predetermined position on a return stroke of the feed rod.

The completion of the insertion of the projection bolt is determined by the signal generated during the return stroke of the feed rod, i.e., between the advancement end and the retraction end of the feed rod. More specifically, the completion time of the bolt insertion is defined as the time when a predetermined time elapses after the projection bolt is actually inserted into the receiving hole. Therefore, since the advancement of the electrode is started after the holding head of the feed rod is sufficiently returned, the interference of the advanced electrode with the holding head can be avoided.

Desirably, in the method of welding a projection bolt, the pushing-out force is exerted by applying an air blast.

As described above, since the pushing-out force is exerted on the projection bolt through the dynamic pressure of the air blast, the projection bolt can be inserted into the receiving hole at a high speed. This is effective for the reduction in operation time.

Desirably, in the method of welding a projection bolt, the pushing-out force is exerted by advancing a pushing-out member.

For example, the pushing-out member is composed of a rod-like member, and this member pushes out the projection bolt in contact therewith. Therefore, the application of the pushing-out force to the projection bolt is reliably achieved.

In the method of welding a projection bolt, a timer unit may be provided which starts time measurement when the feed rod arrives at the advanced position. Advancement of the insertion driving means may be stopped in response to a pushing-out force application-starting signal from the timer unit, and the projection bolt with the end portion thereof inserted into the receiving hole may be advanced by applying the pushing-out force from the holding head.

The timer unit starts the time measurement when the feed rod arrives at the advanced position. When the elapsed time measured by the timer unit reaches a predetermined value, the pushing-out force application-starting signal is generated. The advancement of the insertion driving means is stopped in response to the pushing-out force application-starting signal, and the end portion of the projection bolt is inserted into the receiving hole to a predetermined length. At the same time with the insertion, the pushing-out force is applied to complete the feeding of the projection bolt to the electrode.

The insertion driving means may be composed of, for example, an air cylinder, an advancing-retracting output-type electric motor, or the like. The advancing speed of the insertion driving means can be accurately set by controlling the supply of actuating air, a pulse encoder, or the like. In such a situation, the pushing-out force application-starting signal is generated after the expiration of the time required to insert the end portion of the projection bolt held at the advanced position of the feed rod into the receiving hole. Therefore, the insertion position is accurately set, and subsequently the air blast is applied at predetermined timing, whereby the insertion is reliably completed.

In other words, since the timer unit is activated when the feed rod is located at the advanced position, the time until the application of the pushing-out force is appropriately set. Specifically, since the time measurement is started after the bolt held by the feed rod is moved to the standby position, the time until the application of the pushing-out force is easily set.

Accordingly, the bolt can be easily and accurately moved a short distance at a fast speed, and the adverse effects of the above-described mechanically movable sensor parts such as limit switches can be avoided.

Another aspect of this invention is provided to solve the foregoing problems and is an apparatus for welding a projection bolt. The apparatus is composed of:

an electric resistance welding mechanism including a pair of electrodes and advancing pressurizing means for advancing and retracting one or both of the pair of electrodes along an electrode axis line, any one of the pair of electrodes having a receiving hole formed therein, the receiving hole being coaxial with the electrode axis line, the electric resistance welding mechanism for welding a projection bolt inserted into the receiving hole to a steel plate part;

a welding part-feeding mechanism including a feed rod, advancing-retracting means for advancing and retracting the feed rod holding the projection bolt toward and from the electrode axis line, and insertion driving means for inserting the projection bolt held by the feed rod into the receiving hole;

a steel plate part moving mechanism for inserting the steel plate part between the pair of electrodes and moving a welding point for the projection bolt toward the electrodes; and a control unit for operating the electric resistance welding mechanism, the welding part-feeding mechanism, and the steel plate part moving mechanism. The apparatus thus composed is characterized in that the control unit outputs an actuating signal for the advancing pressurizing means in response to at least a signal indicating completion of insertion of the projection bolt into the receiving hole and a signal indicating completion of movement of the steel plate part, and advancement of the electrodes held in a retracted state is started in response to the actuating signal.

The feed rod holding the projection bolt is advanced toward the electrode axis line by the advancing-retracting means and stopped when the projection bolt is coaxial with the receiving hole. Then, the insertion driving means is actuated to insert the projection bolt into the receiving hole, and the signal indicating completion of the insertion is inputted to the control unit. After completion of the insertion into the receiving hole, the feed rod is retracted by the advancing-retracting means.

The steel plate part moving mechanism is actuated at the same time with the action of feeding the projection bolt by means of the feed rod, and the welding point on the steel plate part to which the projection bolt is to be welded is aligned with the electrodes. The signal indicating completion of the alignment is inputted to the control unit.

As described above, the signal indicating completion of the insertion and the signal indicating completion of the alignment are inputted to the control unit, and an AND operation is performed on these signals. Then, the actuating signal for the advancing pressurizing means is outputted, and the advancement of the electrode held in a retracted state is started in response to the actuating signal.

Therefore, the same operation effects as those described for the invention according to the above described claim 1 are obtained.

The apparatus for welding a projection bolt can be configured such that the feed rod includes a holding head attached to an end portion thereof, that the holding head includes a head body having a holding recess for holding the projection bolt, that a pushing-out member is disposed piercing the head body and is projected from a bottom portion of the holding recess to push out the projection bolt held in the holding recess, and that reciprocating means for advancing and retracting the pushing-out member is attached to the head body.

Only the pushing-out member is advanced from and retracted into the bottom portion of the holding recess by the reciprocating means attached to the head body. Therefore, the advancing-retracting member is minimized, and the space occupied by the advanced pushing-out member is small. Accordingly, the insertion of the projection bolt can be easily performed even in a narrow area without interference with adjacent components. Since the pushing-out member comes into direct contact with the projection bolt to insert it into the receiving hole, the advancement of the projection bolt is reliably achieved. Since blasting sound such as the sound of an air blast is not generated, a quiet factory environment can be obtained. Since the reciprocating means is actuated at a point where the end portion of the projection bolt is inserted into the receiving hole, the length of insertion into the receiving hole responsible for the reciprocating means can be minimized. Therefore, the size of the reciprocating means can be reduced, so that the holding head can be easily advanced into a narrow area. As the reciprocating means, any suitable output unit such as an air cylinder, an advancing-retracting output-type electric motor, or an electromagnetic solenoid may be used according to the form of the apparatus, and therefore an excellent apparatus can be ensured. Even when an air cylinder is used, the structure in which the repeated deformation of the air hose is avoided can be constructed, so that the above problems such as air leakage do not occur.

The apparatus for welding a projection bolt may further comprises a timer unit that starts time measurement when the feed rod arrives at an advanced position. The timer unit generates a signal that sets timing of starting application of a pushing-out force for inserting the projection bolt into the receiving hole, and the signal also serves as a signal for stopping advancement of the insertion driving means.

The timer unit starts the time measurement when the feed rod arrives at the advanced position. When the elapsed time measured by the timer unit reaches a predetermined value, the timer unit generates a pushing-out force application-starting signal. The advancement of the insertion driving means is stopped in response to the pushing-out force application-starting signal, and the end portion of the projection bolt is inserted into the receiving hole to a predetermined length. At the same time with the insertion, the pushing-out force is applied to complete the feeding of the projection bolt to the electrode. The application of the pushing-out force can be achieved, for example, by applying a dynamic pressure through an air blast or by pressurization by the pushing-out member such as a push rod.

The above-described pushing-out force application-starting signal is a "blast-starting signal" when an air blast is used and is realized by an "advancement-starting signal" when the pushing-out member is used.

The insertion driving means may be composed of, for example, an air cylinder, an advancing-retracting output-type electric motor, or the like. The advancing speed of the insertion driving means can be accurately set by controlling the supply of actuating air, a pulse encoder, or the like. In such a situation, the pushing-out force application-starting signal is generated after the expiration of the time required to insert the end portion of the projection bolt held at the advanced position of the feed rod into the receiving hole. Therefore, the insertion position is properly and accurately set, and subsequently the pushing-out force is applied at predetermined timing, whereby the insertion is reliably completed.

In other words, since the timer unit is activated when the feed rod is located at the advanced position, the time until the application of the pushing-out force is appropriately set. Specifically, since the time measurement is started after the bolt held by the feed rod is moved to the standby position, the time until the application of the pushing-out force is easily set.

Accordingly, the bolt can be easily and accurately moved a short distance at a fast speed, and the adverse effects of the above-described mechanically movable sensor parts such as limit switches can be avoided.

In the apparatus for welding a projection bolt, the timer unit may generate, after completion of the insertion of the projection bolt into the receiving hole, a retraction-starting signal that causes the insertion driving means to perform a retracting action.

The advancement of the insertion driving means is stopped at a position at which the end portion of the projection bolt is inserted into the receiving hole to a predetermined length. After the insertion of the projection bolt is completed by applying the pushing-out force, the timer unit generates the retraction-starting signal for retracting the holding head from the stop position. Therefore, the holding head is reliably retracted in response to the retraction-starting signal generated after the expiration of a predetermined time measured by the timer unit. In this manner, the action of returning the holding head after the application of the pushing-out force is reliably performed, so that reliable operation can be ensured.

In the apparatus for welding a projection bolt, the timer unit may generate, after completion of retraction of the insertion driving means, a return-starting signal for returning the feed rod to a retracted position.

Since the return-starting signal is generated after the insertion driving means is retracted, the action of returning the feed rod is carried out subsequently to the retraction of the insertion driving means. Therefore, the action of returning the feed rod is performed successively after the retraction of the insertion driving means. Accordingly, the retraction of the insertion driving means and the action of returning the feed rod are accurately performed in a continuous manner, and therefore the operational reliability of the apparatus is improved.

In the apparatus for welding a projection bolt, a pushing-out force may be further applied to the projection bolt inserted into the receiving hole by the insertion driving means to complete the insertion of the projection bolt into the receiving hole, and the application of the pushing-out force may be continued until the feed rod returns to a midway point on a return stroke thereof.

If the pushing-out force decreases or foreign objects such as iron chippings enter the holding head, the projection bolt held by the holding head may not be introduced into the receiving hole by the pushing-out force. When such a phenomenon occurs, the projection bolt remains held by the holding head during the action of returning the feed rod, and a so-called "bolt bringing back phenomenon" occurs. Accordingly, the pushing-out action of the pushing-out force is continued until the holding head returns to the midway point on the return stroke as described above. In this manner, the projection bolt remaining on the holding head is removed during the returning action to prevent damage to the holding head caused by the projection bolt. For example, when an air blast is used, the application of the air blast is continued until the holding head returns to the midway point on the return stroke, and the projection bolt is thereby blown off and removed. When the pushing-out member is used, the projecting state of the pushing-out member is maintained until the holding head returns to the midway point on the return stroke, whereby the projection bolt is caused to drop off and removed.

In the apparatus for welding a projection bolt, the stopper unit may be of a type in which the projection bolt transferred through a feed passage by an air blast is temporarily stopped by a stopper piece and then the stopper piece is moved to a pass position to allow the projection bolt to pass through a feed tube and be held by the holding head of the feed rod. The stopper unit may be configured such that relative positions of the holding head and the feed tube are set such that the position of the holding head appropriately coincides with the position of the feed tube when the feed rod is stopped at a retracted position, and that the stopper piece is moved from a stop position to the pass position in response to a retracted position signal generated when the feed rod is stopped at the retracted position.

The projection bolt transferred through the feed passage by the air blast is temporarily stopped by the stopper piece held in a closed state, so that the impact on the holding head is alleviated. Subsequently, the stopper piece is moved to the pass position in response to the retracted position signal, and the projection bolt thereby arrives at the holding head.

More specifically, the relative positions of the feed tube and the holding head are set such that the position of the holding head coincides with the position of the feed tube when the feed rod is retracted. As described above, after the feed rod is stopped at the retracted position, the stopper piece is actuated in response to the retracted position signal, and then the stopped projection bolt passes through the stopper piece and is received by the holding head. Therefore, when the feed rod is fully returned, the stopper unit is brought into a passing state.

As described above, the retracted position signal is generated when the feed rod is located at the retracted position, and the stopper unit is actuated in response to this signal. Therefore, the projection bolt is fed after the feed rod is returned and the position of the feed tube coincides with the position of the holding head. Accordingly, the projection bolt is reliably held by the holding head, and therefore reliable operation can be obtained.

In particular, as for the relative positions of the feed tube and the holding head, if the stop position of the feed rod is displaced even slightly, a phenomenon occurs in which the projection bolt is not correctly transferred to the holding head. Therefore, the stopper unit must be brought into the passing state under the condition that the operating position of the feed rod is accurately obtained. In the present invention, this important requirement can be reliably satisfied by the relation with the retracted position of the feed rod.

In the apparatus for welding a projection bolt, application of the air blast to the projection bolt may be carried out at substantially the same time as when the feed rod is advanced and a projection bolt arrives at a target place.

At substantially the same time with the arrival of another projection bolt at the target place, the air blast is applied to the projection bolt in the feed passage. Specifically, the application of the air blast to the feed passage is carried out at substantially the same time with the feeding of another projection bolt to the target place by the feed rod. Therefore, the action of returning the feed rod after completion of feeding and the transfer of the projection bolt to the stopper unit can be carried out at the same time. This is effective for reducing the operation time of the apparatus.

A first projection bolt is transferred to the stopper unit by the air blast described above, and the first projection bolt then arrives at the holding head in response to the retracted position signal of the feed rod. Specifically, after the first projection bolt is reliably transferred to the holding head, a second projection bolt for the next stroke of the feed rod is transferred to the stopper unit by an air blast. Therefore, after the first projection bolt is successfully fed by the advancement of the feed rod, the second projection bolt is transferred, so that an accurate and stable feeding cycle can be obtained. This improves the operation reliability of the apparatus.

In all the welding methods and the welding apparatus of the present invention, the projection bolt with its end portion inserted into the receiving hole is fully inserted into the receiving hole by applying the pushing-out force. The application of the pushing-out force is carried out by applying the dynamic pressure of an air blast or applying a pushing-out force by a pushing-out member such as a pushing rod. In embodiments described later, the dynamic pressure of an air blast or the pressurizing force of the pushing-out member is used. These specific techniques are employed to obtain the pushing-out force. In other words, the expression "the application of the pushing-out force" is used because it is obvious that the application of the dynamic pressure of an air blast or the pressing action of a pushing-out member can exert the pushing-out force.

BRIEF DESCRIPTION OF THE DRAWINGS

FIG. 10A is a cross-sectional view illustrating another feed rod and the movable electrode.

FIG. 10B is a partial enlarged view of FIG. 10A.

FIG. 11A is an enlarged cross-sectional view of a holding head.

FIG. 11B is an exterior side view of the holding head.

Figures 1A, 1B:
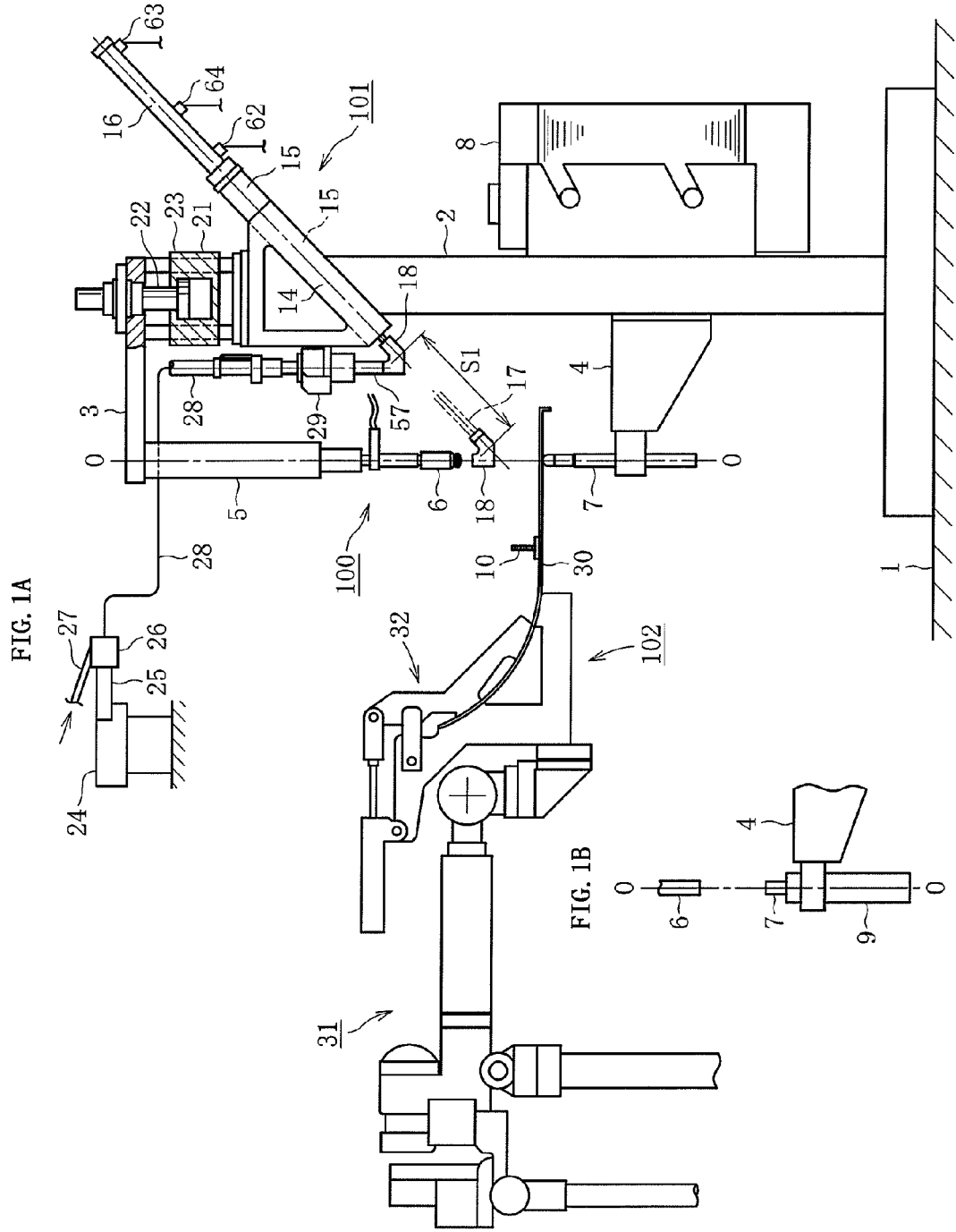
FIG. 1A is a side view illustrating the general configuration of an apparatus.
FIG. 1B is a side view of a pair of electrodes.

DESCRIPTION OF REFERENCE NUMERALS 5 advancing pressurizing means, air cylinder
6 movable electrode
7 fixed electrode
10 projection bolt
16 advancing-retracting means, air cylinder
17 feed rod
18 holding head
20 receiving hole
21 insertion driving means, air cylinder
24 parts feeder
26 feed control unit
27 air blast tube
29 stopper unit
30 steel plate part
31 robot device
32 feed passage
33 receiving hole, holding recess
36 air passage
48 air blast hole
54 stopper piece
57 feed tube
60 air switching valve
61 timer unit
62 advanced position sensor
63 retracted position sensor
64 midway position sensor
80 head body
81 bottom portion
82 pushing-out member
83 reciprocating means, air cylinder
90 introducing rod, introducing mechanism
100 electric resistance welding mechanism
101 welding part-feeding mechanism
102 steel plate part moving mechanism
103 control unit

BEST MODE FOR CARRYING OUT THE INVENTION

Next, the best mode for embodying the method and apparatus for welding a projection bolt of the present invention will be described.

Embodiment 1

FIGS. 1 to 7 show an embodiment 1.

A description will be given of the projection bolt.

The projection bolt 10 is made of iron. As shown in FIG. 2B, a circular flange portion 12 is formed integrally with a shaft portion 11, and a circular welding projection 13 is provided on a flange surface opposite to the shaft portion 11. The flange portion 12 is concentric with the shaft portion 11. As to the dimensions of respective portions, the shaft portion 11 has, a diameter of 5 mm and a length of 23 mm, and the flange portion has a diameter of 13 mm and a thickness of 1 mm. The welding projection 13 has a diameter of 9 mm and a projecting thickness of 1.2 mm. In the following description, the projection bolt may be simply referred to as a bolt in some cases.

A description will be given of the general configuration of the welding apparatus.

FIG. 1A is a side view illustrating the general configuration of the welding apparatus. A supporting post 2 is secured substantially vertically to a floor 1, and support arms 3 and 4 are secured substantially in a horizontal direction to the upper end and a lower portion of the supporting post 2. An air cylinder 5 serving as advancing pressurizing means is attached substantially in a vertical direction to the support arm 3, and a movable electrode 6 is connected to the piston rod of the air cylinder 5. Any suitable means may be used as the advancing pressurizing means so long as it produces advancing-retracting output. Examples thereof employed herein include, in addition to the air cylinder 5, an electric motor, a rack and pinion mechanism, and the like that produce advancing-retracting output.

A fixed electrode 7 that is paired with the movable electrode 6 is attached to the support arm 4 so as to be coaxial with the movable electrode 6. Reference symbol O-O represents the electrode axis line of the electrodes 6 and 7. A welding transformer 8 for supplying a welding current is secured to the supporting post 2. The air cylinder 5, the movable electrode 6, the fixed electrode 7, the welding transformer 8 describe above, and other components constitute an electric resistance welding mechanism 100. The fixed electrode 7 may be of a raising-lowering type. Specifically, as shown in FIG. 1B, an air cylinder 9 is secured to the support arm 4, and the electrode 7 is raised-lowered by the power of the air cylinder 9. In this manner, the space between the electrodes 6 and 7 can be increased to facilitate the movement of a steel plate part.

As described above, instead of advancing and retracting the upper electrode 6, the lower electrode 7 may be advanced and retracted. Alternatively, both the electrodes 6 and 7 may be advanced and retracted. In these cases, one or both of the pair of electrodes are advanced and retracted along the electrode axis line by the advancing pressurizing means.

Figure 4:
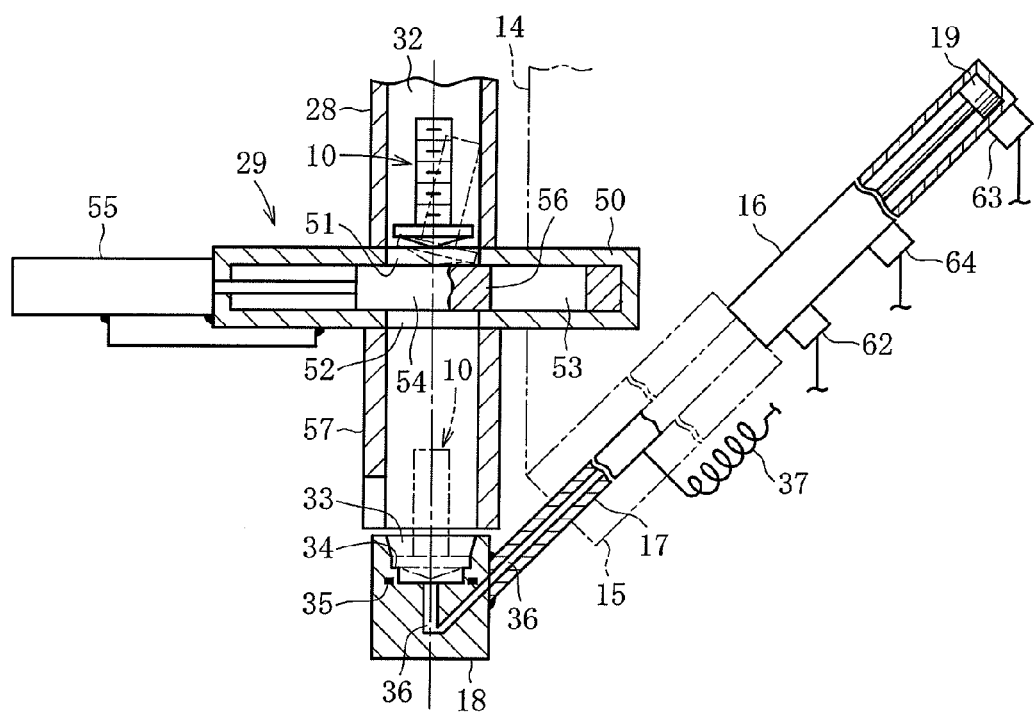
FIG. 4 is a cross-sectional view of a stopper unit.

A welding part-feeding mechanism 101 is provided to cause a bolt 10 to be held by the movable electrode 6. As also shown in FIG. 4, a guide tube 15 is secured to an inclined portion of a triangular base 14, and an air cylinder 16 serving as advancing-retracting means is connected to one end portion of the guide tube 15. A feed rod 17 is connected to the piston rod of the air cylinder 16, and a holding head 18 is secured to one end portion of the feed rod 17. Therefore, the feed rod 17 is disposed so as to obliquely intersect the electrode axis line O-O. Any suitable means may be used as the advancing-retracting means so long as it produces advancing-retracting output. Examples thereof employed herein include, in addition to the air cylinder 16, an electric motor, a rack and pinion mechanism, or the like that produce advancing-retracting output.

Figure 2A:
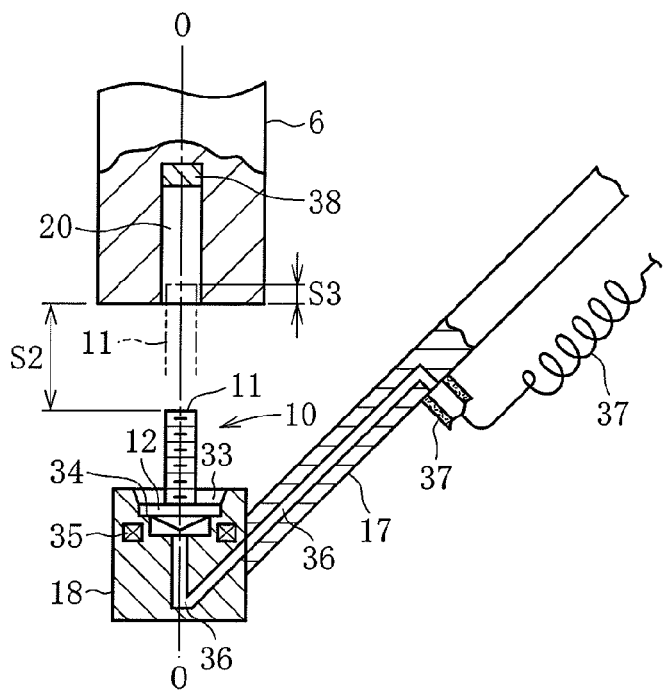
FIG. 2A is a cross-sectional view illustrating a feed rod and the movable electrode.
Figure 2B:
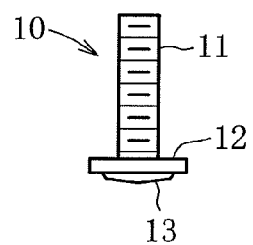
FIG. 2B is an exterior view of a projection bolt.

As shown in FIG. 2A, a receiving hole 20 is provided in the movable electrode 6 so as to be coaxial with the electrode axis line O-O. To insert the shaft portion 11 into the receiving hole 20, the base 14, the guide tube 15, the air cylinder 16, and the feed rod 17 are raised and lowered integrally. An air cylinder 21 serving as insertion driving means (i.e. an insertion driving unit) is provided to raise-lower the above components. In the air cylinder 21 a vertically disposed piston rod 22 is secured to the support arm 3 serving as a stationary member, and a cylinder body 23 is connected to the base 14. Therefore, the cylinder body 23 serves as a raising-lowering member.

The bolts 10 are continuously fed from a feeding passage member 25 of a parts feeder 24 and are fed one by one by the action of a feed control unit 26. A single bolt 10 fed from the feed control unit 26 is sent through a feed hose 28 to a stopper unit 29 secured to the base 14. The bolt 10 is delivered to the stopper unit 29 by an air blast from an air blast tube 27.

Reference numeral 30 represents a steel plate part to which the projection bolts 10 are welded. The steel plate part 30 may have any of various shapes such as a substantially flat shape, a shape having an L-shaped cross-section, and a shape formed of a combination of, for example, a recessed portion, a curved portion, and a flat portion. The steel plate part 30 shown herein has a relatively simple shape including a flat portion and a curved portion continuous with the flat portion.

After a first bolt 10 is welded to the steel plate part 30, a second welding point is moved to a position on the electrode axis line O-O so that a second bolt 10 is welded. A steel plate part moving mechanism 102 is provided to achieve the above movement. Any mechanism may be used as the above mechanism 102 so long as it can hold and move the steel plate part 30. The mechanism 102 used in this embodiment is a generally used robot device 31. This robot device 31 is of a general six-axis type. Reference numeral 32 represents a chuck mechanism for holding the steel plate part 30.

The receiving hole 20 of an electrode is provided in the movable electrode 6, as shown in FIG. 2A, but may be provided in the fixed electrode 7. In such a case, the feed rod 17 is advanced from obliquely below to insert the bolt 10 from above. The receiving hole coaxial with the electrode axis line is formed in one of the electrodes.

Next, a detailed description will be given of the structure of the feed rod 17.

As shown in FIG. 2A, the holding head 18 connected to one end portion of the feed rod 17 is produced by machining a block material made of non-magnetic stainless steel, and the flange portion 12 is received by an upwardly opening circular receiving hole 33. The receiving hole 33 has an annular step portion 34 formed therein, and the surface of the flange portion 12 is placed on the step portion 34. The attraction force of a permanent magnet 35 embedded in the holding head 18 acts on the flange portion 12 to ensure the placement thereof.

An air passage 36 is provided so as to communicate with the bottom of the receiving hole 33. This air passage 36 is in communication with an air hose 37 through the inside of the feed rod 17. The air hose 37 is connected to the feed rod 17 through a joint tube (not shown), formed into a coil shape so as to be expandable and contractible when the feed rod 17 is advanced and retracted, and connected to an air switching valve described later. A permanent magnet 38 is secured to the recessed end portion of the receiving hole 20 and attracts the shaft portion 11 entering the receiving hole 20 to prevent the bolt 10 from falling out.

Next, a detailed description is given of the structure of the feed control unit 26.

Figure 3A:
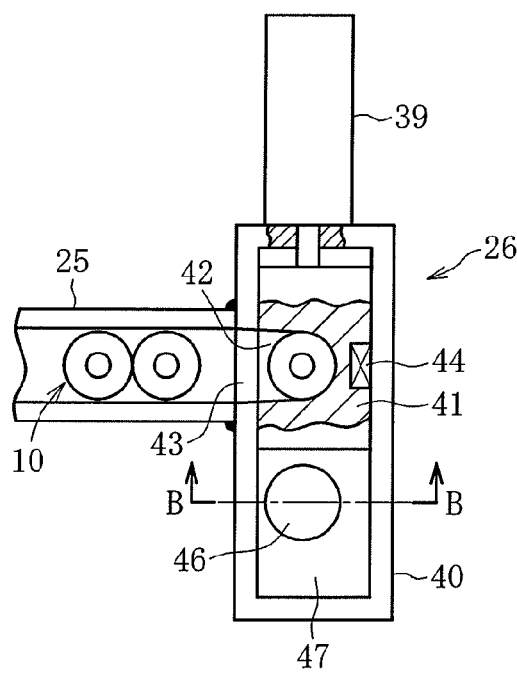
FIG. 3A is a plan view of a feed control unit.
Figure 3B:
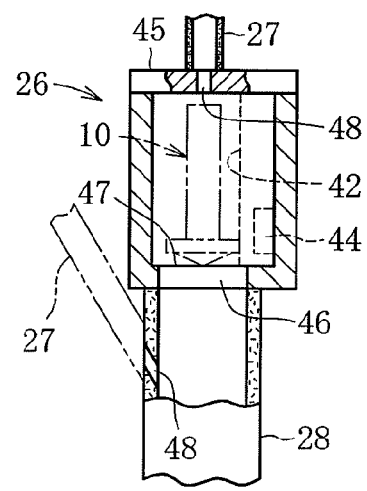
FIG. 3B is a cross-sectional view of the feed control unit.

As shown in FIG. 3, the bolts 10 continuously fed from the feeding passage member 25 are sent one by one from the feed control unit 26. A moving piece 41 is disposed in a substantially rectangular parallelepiped-shaped outer case 40 so as to be slidable in the lengthwise direction of the outer case 40. The moving piece 41 has a rectangular parallelepiped shape and includes a receiving recess 42 formed in its central portion. This receiving recess 42 is in communication with the feeding passage member 25 through an entry hole 43 formed in the outer case 40. The moving piece 41 is advanced and retracted by an air cylinder 39 secured to the outer case 40. A permanent magnet 44 is embedded in the moving piece 41 so that the bolt 10 entering the receiving recess 42 is held in position. In FIG. 3A, a cover plate 45 shown in FIG. 3B is not shown for the sake of facilitating the understanding.

A feed hole 46 is provided in a bottom plate 47 of the outer case 40, and an air blast hole 48 coaxial with the feed hole 46 is formed in the cover plate 45. The air blast tube 27 is connected to the air blast hole 48. This air blast tube 27 is connected to the air switching valve described later. The feed hose 28 is connected to the feed hole 46. The feed hose 28 is made of a urethane resin so as to be bendable into a desired shape. Reference numeral 32 (see FIG. 4) represents a feed passage inside the feed hose 28.

When the bolt 10 in the feeding passage member 25 is attracted by the permanent magnet 44 and received by the receiving recess 42, the moving piece 41 is moved by the action of the air cylinder 39 and stopped at a position at which the receiving recess 42 aligns with the feed hole 46. At the same time as when the moving piece 41 is stopped, a blast of air is directed from the air blast hole 48, and the bolt 10 is thereby transferred swiftly through the feed hose 28 and reaches the stopper unit 29.

The air blast hole 48 is formed in the feed control unit 26. However, the air blast hole 48 may be in communication with the feed hose 28 close to the feed control unit 26, as shown by a long dashed double-short dashed line.

A detailed description will now be given of the structure of the stopper unit 29.

As shown in FIG. 4, an entry hole 51 and a feed hole 52 are provided in a unit case 50 so as to be opposed to each other, and a stopper piece 54 having a passing hole 53 slides inside the unit case 50.

This stopper piece 54 is advanced and retracted by the air cylinder 55 attached to the unit case 50. A solid portion provided adjacent to the passing hole 53 is a stopping portion 56.

In the state shown in the figure, the stopping portion 56 closes the entry hole 51. As described above, the bolt 10 is transferred from the feed control unit 26 by air at a high speed. The welding projection 13 of this bolt 10 then collides with the stopping portion 56 at a high speed and is temporarily stopped as shown by a long dashed double-short dashed line. In this manner, the bolt 10 is temporarily stopped to avoid the direct collision of the bolt 10 with the step portion 34 of the holding head 18, so that the damage to the holding head 18 is prevented. Subsequently, the stopper piece 54 is moved by the action of the air cylinder 55. When the passing hole 53 is aligned with the entry hole 51 and the feed hole 52, the bolt 10 drops into a feed tube 57 connected to the unit case 50.

When the feed rod 17 is located at a retracted position, i.e., a piston 19 of the air cylinder 16 is located at the most retracted position, the receiving hole 33 of the holding head 18 coincides with the passage of the feed tube 57, and the flange portion 12 of the bolt 10 smoothly drops into the receiving hole 33. More specifically, the relative positions of the feed tube 57 and the feed rod 17 are set such that the receiving hole 33 coincides with the feed tube 57 when the feed rod 17 is retracted.

The moving distances of the actuated parts of the entire apparatus are as follows.

The stroke distance S1 (see FIG. 1A) is 350 mm. The stroke distance S1 is a distance from the retracted position of the feed rod 17, i.e., the position at which the receiving hole 33 of the holding head 18 accurately coincides with the passage of the feed tube 57 as shown in FIG. 4, to the advanced position of the feed rod 17, i.e., the position at which the shaft portion 11 of the bolt 10 held by the holding head 18 is coaxial with the receiving hole 20 as shown in FIG. 2A. The spacing S2 (see FIG. 2A) is 17 mm. The spacing S2 is a spacing between the lower end surface of the movable electrode 6 and the end portion of the shaft portion 11 when the advancement of the holding head 18 is stopped and the shaft portion 11 is coaxial with the electrode axis line O-O. The insertion length S3 (see FIG. 2A) of the shaft portion 11 into the receiving hole 20 is 3 mm. The insertion length S3 is a length defined when the end portion of the shaft portion 11 enters the receiving hole 20 by the action of the air cylinder 21 and an air blast is ready to be applied from the air passage 36.

A description will now be given of a control system for operating the entire apparatus.

Figure 5A:
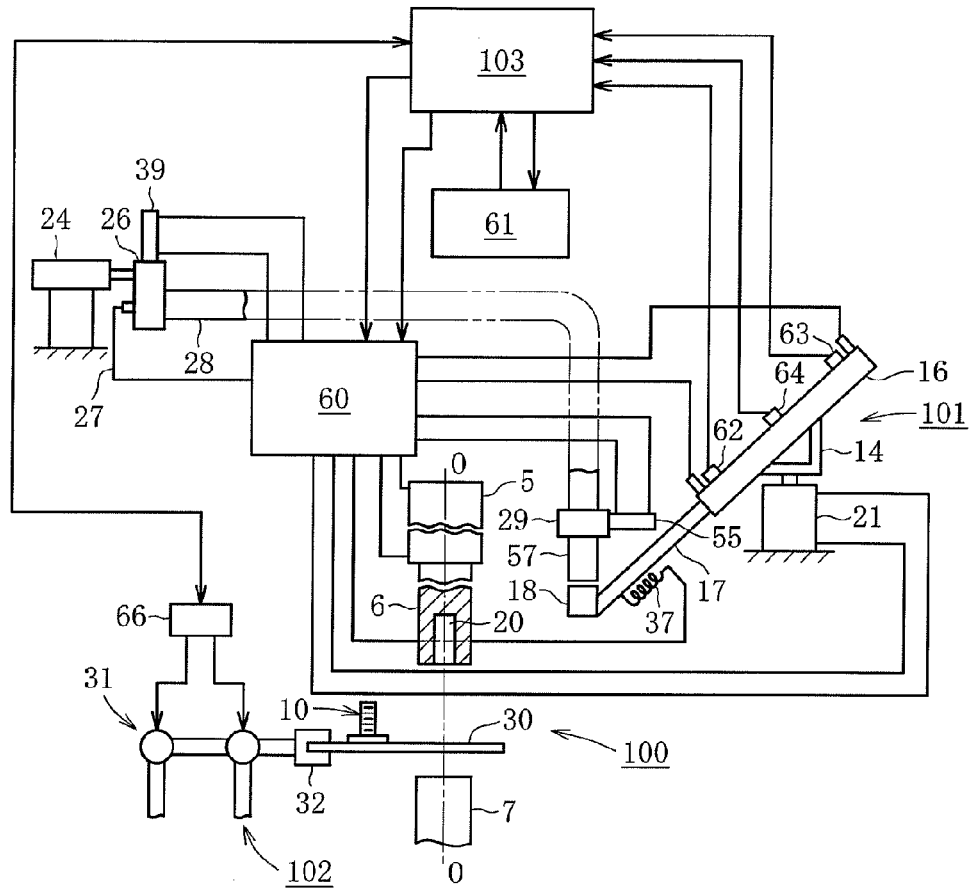
FIG. 5A is a block diagram illustrating the control system of the apparatus.
Figure 5B:
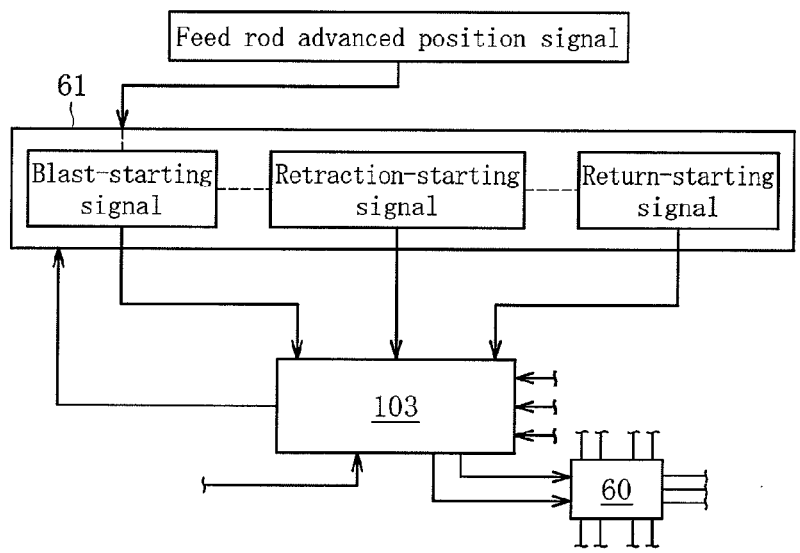
FIG. 5B is an enlarged view of a timer portion in FIG. 5A.

FIG. 5 is a block diagram showing the control system. The control is performed by a control unit 103. The control unit 103 is composed of a generally used sequencer device, a computer device, or a similar device. An air switching valve 60 for supplying actuating air to each air cylinder is operated by actuating signals outputted from the control unit 103. Moreover, time measurement signals are sent from a timer unit 61 to the control unit 103, and the action of inserting the shaft portion 11 into the receiving hole 20 is performed in response to an actuating signal outputted based on the time measurement signals. The timer unit 61 itself generates, for example, an air blast-starting signal, a retraction-starting signal for the holding head, a return-starting signal for the feed rod, and other signals at predetermined elapsed time periods after the start of the time measurement. This is described in FIG. 5B and below.

In FIG. 5, arrowed lines represent communication lines for sending a stroke position signal of the air cylinder 16 to the control unit 103, sending and receiving signals between the control unit 103 and the timer unit 61, and supplying an actuating signal from the control unit 103 to the air switching valve 60. The lines connecting the air switching valve 60 to the air cylinders are air tubes for supplying and exhausting air.

An advanced position sensor 62 for detecting the advanced position of the feed rod 17 and a retracted position sensor 63 for detecting the retracted position of the feed rod 17 are attached to the air cylinder 16. In addition, a midway position sensor 64 for the feed rod 17 is disposed midway between the sensors 62 and 63. These sensors 62, 63, and 64 are of the type of detecting the position of the piston 19 of the feed rod 16 and are electromagnetic detection sensors commonly used. Alternatively, to detect these three positions, a pulse encoder that generates a position signal in response to the stroke movement of the air cylinder 16 may be used.

In the state shown in FIG. 5A, the feed rod 17 is located at the retracted position, and therefore the signal from the retracted position sensor 63 is inputted to the control unit 103. An actuating signal thereby generated is sent to the air switching valve 60. Then, actuating air is supplied from the air switching valve 60 to the air cylinder 55 of the stopper unit 29, and the stopper piece 54 is moved from the stop position to the pass position, whereby the bolt 10 in the standby position shown by the long dashed double-short dashed line in FIG. 4 drops into the holding head 18 and placed on the step portion 34. After the bolt 10 passes through the stopper piece 54, the stopper piece 54 immediately returns to the original stop position by the action of the air switching valve 60.

In the above state, a startup signal is outputted from the control unit 103, and actuating air is supplied from the air switching valve 60 to the air cylinder 16 to advance the feed rod 17. Then, the advancement of the feed rod 17 is stopped in response to the detection signal from the advanced position sensor 62 (see FIG. 6A). More specifically, the signal from the advanced position sensor 62 is inputted to the control unit 103, and the air switching valve 60 is thereby actuated, to stop the insertion of the air cylinder 16. In this state, the shaft portion 11 is coaxial with the receiving hole 20 as shown in FIG. 2A.

Actuating air is supplied to the air cylinder 21 serving as the insertion driving means in response to the detection signal from the advanced position sensor 62, i.e., the "feed rod advanced position signal" shown in FIG. 5B, and the bolt 10 held by the holding head 18 is thereby raised. Upon the start of the raising action of the air cylinder 21, the timer unit 61 starts time measurement in response to the "feed rod advanced position signal."

Figure 6A:
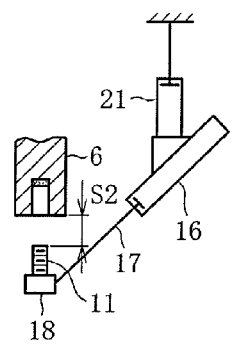
FIG. 6A is a cross-sectional view illustrating a bolt insertion process.
Figure 6B:
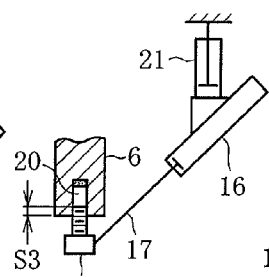
FIG. 6B is a cross-sectional view illustrating the bolt insertion process.
Figure 6C:
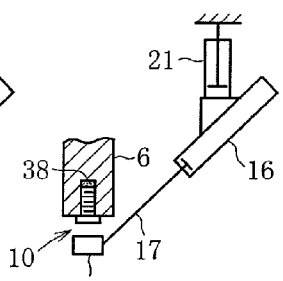
FIG. 6C is a cross-sectional view illustrating the bolt insertion process.

A blast-starting signal is sent from the timer unit 61 to the control unit 103 when 0.3 seconds elapse after the timer unit 61 starts the time measurement, whereby the raising of the air cylinder 21 is stopped (see FIG. 6B). This stop position is located at a position at which the end portion of the shaft portion 11 is inserted at the distance S3 of 3 mm into the receiving hole 20. At the same time as when the raising of the air cylinder 21 is stopped, the air from the air switching valve 60 is supplied from the air passage 36 through the air hose 37 to the welding projection 13 and the flange portion 12, and the bolt 10 enters the receiving hole 20 against the attractive force of the permanent magnet 35. The upper surface of the flange portion 12 comes into intimate contact with the end surface of the movable electrode 6, and bolt 10 is stopped (see FIG. 6C). This stop position is maintained by the attractive force of the permanent magnet 38. When the application of the air blast is started, the shaft portion 11 is inserted at a position of 3 mm into the receiving hole 20. Therefore, the shaft portion 11 is smoothly enters the receiving hole 20 at a high speed without any deviation.

To stop the shaft portion 11 such that its end is inserted to a position of 3 mm as described above, the advancing speed of the air cylinder 21 is set such that the shaft portion 11 moves 20 mm, which is the total length of the spacing S2 and the distance S3, in 0.3 seconds. This advancing speed is set by the supply rate of air from the air switching valve 60. The air supply rate is set by controlling the air switching valve 60 in response to the signal from the control unit 103. Alternatively, the speed may be adjusted by an air throttle valve (speed control valve) attached to the air cylinder 21. In other words, by setting the elapsed time to 0.3 seconds, the shaft portion 11 can be stopped accurately at a position at which it is inserted to a distance of 3 mm. The accurate stop position can be ensured because the raising rate of the air cylinder 21 can be set accurately. Therefore, fine control of the stop of the insertion of the shaft portion 11 at a position at which its end is inserted to a distance of 3 mm followed by the application of an air blast is accurately achieved by the time count of the timer unit 61. Instead of the above air cylinder 21, an advancing-retracting output-type electric motor provided with a pulse encoder may be used.

The period of time when the holding head 18 is raised to the air blast position is 0.2 seconds until 0.5 seconds elapse after the start of the time measurement. The air blast is applied within the time period of 0.2 seconds. The time required to complete the insertion of the bolt 10 into the receiving hole by the application of the air blast is very short. More specifically, the insertion of the bolt 10 by the air blast is completed within a time period of much less than 0.2 seconds. It is difficult to measure the time required to complete the insertion because the bolt 10 moves a short distance at a fast speed, but the time required to complete the insertion may be 0.01 seconds to 0.03 seconds. Therefore, the insertion of the bolt 10 by the air blast can be reliably completed within an ample time period of 0.2 seconds.

The above time values of 0.01 seconds to 0.03 seconds are values when the opening diameter of the air passage 36 of the holding head 18 is 3 mm and the operating air pressure is 5 Kgf/cm².

Subsequently, when 0.5 seconds elapse after the start of the time measurement by the timer unit 61, the retraction-starting signal is sent from the timer unit 61. The air cylinder 21 is lowered in response to the retraction-starting signal, and the holding head 18 returns to a position immediately below the movable electrode 6, i.e., the position shown in FIG. 2A (see FIG. 6D). The returning distance is 20 mm as described above, and the time required for this distance is estimated to be 0.1 seconds. Therefore, when the required returning time is set to 0.2 seconds in the timer unit 61, it is enough for the holding head 18 to return to the position shown in FIG. 6D until 0.7 seconds elapse after the start of the time measurement. This is also advantageous in that the returning action can be reliably preformed within an ample time period.

Figure 6D:
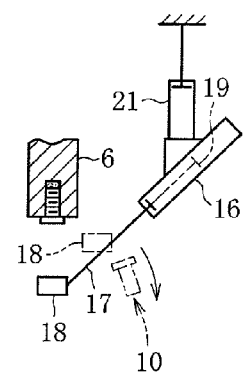
FIG. 6D is a cross-sectional view illustrating the bolt insertion process.

After the holding head 18 returns to the position shown in FIG. 6D and 0.7 seconds elapse after the start of the time measurement, the return-starting signal for retracting the feed rod 17 by the air cylinder 16 is sent from the timer unit 61 to the control unit 103. Therefore, the air cylinder 16 returns in response to an actuating signal from the control unit 103, and the feed rod 17 returns to the retracted position.

As described above, the air blast from the air passage 36 is started in response to the blast-starting signal, and the air blast is stopped when the feed rod 17 (the holding head 18) returns to the midway point between the advanced position sensor 62 and the retracted position sensor 63. Accordingly, a detection signal from the midway position sensor 64 is sent to the control unit 103, whereby the air switching valve 60 is actuated to stop the air blast. By continuing the application of the air blast until the holding head 18 returns to the midway point as described above, the bolt 10 remaining on the holding head 18 can be blown off by the air blast during the returning action (see long dashed double-short dashed lines in FIG. 6D). Therefore, damage to the receiving hole 33 of the holding head 18 caused by a collision of the shaft portion 11 with the feed tube 57 can be prevented. Such a so-called "bolt bringing back phenomenon" may occur when the air blast pressure decreases for some reason or foreign objects such as iron chippings enter the receiving hole 33. To prevent the above phenomenon, the bolt 10 is caused to drop off during the returning action of the feed rod 17.

As a signal indicating complete insertion of the bolt 10 into the receiving hole 20, a time measurement signal from the timer unit 61, for example, a signal generated when 0.4 seconds elapse after the start of the time measurement may be used. To allow for a sufficient time margin, the signal used in this embodiment is generated when the feed rod 17 is located at a predetermined position on the return stroke thereof, i.e., by the midway position sensor 64 during the returning action of the feed rod 17. The above predetermined position is set to allow for a distance enough to sufficiently return the holding head 18 by the returning action of the air cylinder 16.

Moreover, as shown in FIG. 5A, the robot device 31 itself includes a robot control unit 66, and signals therefrom control various movements of the robot device 31. When a welding point on the steel plate part 30 to which the bolt 10 is to be welded is aligned with the fixed electrode 7 during these movements, a signal is generated by the robot control unit 66 and sent to the control unit 103.

An AND operation is performed on the signal indicating complete insertion of the bolt 10 into the receiving hole 20 and the signal generated when the welding point on the steel plate part 30 to which the bolt 10 is to be welded is aligned with the fixed electrode 7, and the advancement of the movable electrode 6 is started. More specifically, after it is confirmed that the bolt 10 is securely held by the movable electrode 6 and that the steel plate part 30 is placed at a suitable position relative to the electrodes, the movable electrode 6 is advanced. When the welding point on the steel plate part 30 to which the bolt 10 is to be welded is first aligned with the fixed electrode 7 and then the function of the returning signal for the feed rod 17 is activated, the midway position sensor 64 by which the returning signal obtained during the return stroke is more advantageous in terms of time reduction. If the returning signal obtained by the retracted position sensor 63 is used, an additional time for a return stroke from the sensor 64 to the sensor 63 is required.

In the manner described above, the control unit 103 receives at least the completion signal of the bolt insertion into the receiving hole 20 and the completion signal of the movement of the steel plate part 30 and outputs an actuating signal for the air cylinder 5 serving as the advancing pressurizing means. The advancement of the movable electrode 6 held in the retracted state is started in response to the above actuating signal.

The movable electrode 6 is advanced in the manner described above, and the welding projection 13 of the bolt 10 is pressed against the steel plate part 30. Then, a welding current is applied to complete welding.

The relative positions of the feed tube 57 and the feed rod 17 are set such that the receiving hole 33 coincides with the feed tube 57 when the feed rod 17 is retracted. As described above, when the feed rod 17 is stopped at the retracted position, a retracted position signal from the retracted position sensor 63 is sent to the control unit 103. Then, the air cylinder 55 is actuated to allow the stopped bolt 10 to pass through the passing hole 53 and be received by the receiving hole 33 of the holding head 18. Therefore, when the feed rod 17 is fully returned, the stopper unit 29 is brought into a passing state.

The bolt 1 is inserted into the receiving hole 20 in response to the blast-starting signal. The completion of the insertion by this action corresponds to the state in which the feed rod 17 is advanced and arrived at a target point, i.e., the receiving hole 20. At substantially the same time with the arrival of the bolt at the target position, an air blast is applied from the feed control unit 26 to the bolt 10. More specifically, at the same time with the start of the application of the air blast from the air passage 36 of the holding head 18, an air blast is applied to a bolt 10 from the air blast hole 48, and the bolt is thereby transferred to the stopper unit 29 and stopped. In other words, when the application of the air blast is performed in the holding head 18, the feed rod 17 is located at the advanced position, and the stopping portion 56 of the stopper unit 29 is in a closed state with no bolt 10 caught thereby. Therefore, by applying an air blast from the air blast hole 48 at the same time with the application of an air blast in the holding head 18, the transfer of the bolt 10 through the feed hose 28 and the returning of the feed rod 17 can be carried out at the same time. This is effective for reducing the operation time of the apparatus.

FIG. 1A shows a state in which the steel plate part 30 has already has a bolt 10 welded thereto and been moved by the robot device 31 and the next welding point is aligned with the fixed electrode 7. In this operation, after the bolt 10 is welded and the movable electrode 6 is retracted, a startup signal is generated by the robot control unit 66 in response to the signal from the retracted position sensor 63, and then the movement to the next welding point is carried out by the robot device 31.

The simple movement shown in FIG. 1A is made in a space including the electrode axis line O-O. However, if the steel plate part 30 is required to be reversed, it cannot be reversed in a small space between the electrodes 6 and 7. In this case, the steel plate part 30 is reversed after moved outside the space between the electrodes 6 and 7. Therefore, this reversing operation is carried out in a space not including the electrode axis line O-O.

Figure 7:
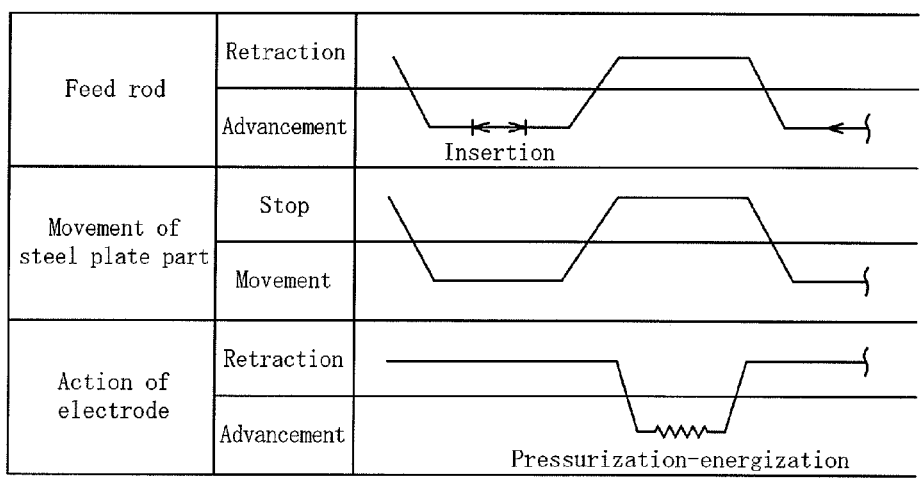
FIG. 7 is a timing chart showing the movement of each part.

FIG. 7 is a timing chart showing the relationship between the advancing-retracting movement of the feed rod 17, the movement of the steel plate part 30 by the robot device 31, and the advancing-retracting movement of the movable electrode 6. As is clear from FIG. 7, the action of inserting the bolt 10 into the receiving hole 20 and the action of aligning the welding point with the fixed electrode 7 by the robot device 31 are carried out in an overlapping manner. After the feed rod 17 is retracted and the welding point on the steel plate part 30 is aligned with the fixed electrode 7, the movable electrode 6 is advanced, and pressurization and energization are carried out.

The parts feeder 24 is configured to feed the bolts 10 from the feeding passage member 25 of a vibrating bowl. In addition to such a parts feeder, any of various parts feeders may be used such as a parts feeder in which a predetermined number of parts attracted by magnets attached to a rotating plate are fed through a feed passage and a parts feeder in which parts are moved to a feed passage using a rotating disk and fed from a transfer passage.

In the above embodiment, various air cylinders are used. Instead of these air cylinders, electric motors producing and rack-and-pinion mechanisms that can output advancing-retracting power may be used.

The operation effects of the above-described embodiment 1 are as follows.

As described above, since the signal generated upon insertion of the bolt 10 into the receiving hole 20 is used, even if an abnormal situation occurs in which the bolt 10 is not inserted into the receiving hole 20 of the movable electrode 6 for some reason, the movable electrode 6 is not accidentally advanced. Therefore, an effective preventive measure against miss feeding of the bolt 10 is taken.

Moreover, as described-above, since the signal generated when the welding point on the steel plate part 30 to which the bolt 10 is to be welded is aligned with the fixed electrode 7 is used, the movable electrode 6 can be reliably advanced at appropriate timing even when there are variations in the time required until the welding point is aligned with the fixed electrode 7. Therefore, even when the steel plate part 30 is moved forward, backward, left, or right or turned upside down by the robot device 31, the movable electrode 6 can be reliably advanced irrespective of variations in the time required for the above movements. In other words, even when the distance from a first welding point to a second welding point is short but the distance between the second welding point to a third welding point is long, the advancement of the movable electrode is appropriately started.

The action of inserting the projection bolt 10 into the receiving hole 20 and the action of aligning the welding point with the fixed electrode 7 are performed in an overlapping manner.

Since the action of inserting the projection bolt 10 into the receiving hole 20, i.e., the time period required until the feed rod 17 is advanced to insert the bolt 10 held therein into the receiving hole 20 overlaps the time period required to align the welding point with the fixed electrode 7, the insertion of the bolt and the movement of the steel plate part are carried out in an overlapping manner. This is effective to reduce the time required for welding. In particular, since the action of inserting the bolt 10 into the receiving hole 20 and the movement of the steel plate part 30 are carried out in an overlapping manner, the maximum required time is a longer one of the time required to feed the bolt 10 to the movable electrode 6 and the time required to move the steel plate. Therefore, a situation in which the maximum required time is given as the sum of these times can be avoided.

The signal generated upon insertion of the bolt 10 into the receiving hole 20 is a signal generated by the midway position sensor 64 when the feed rod 17 is located at a predetermined position on the return stroke thereof. The attachment position of the midway position sensor 64 is set such that the sensor 64 generates the signal when the holding head 18 is located at a position sufficiently away from the advancing space of the movable electrode 6. The attachment position of the midway position sensor 64 is also set in consideration of the time reduction described above.

The completion of the bolt insertion is determined by the signal from the midway position sensor 64 that is obtained during the return stroke of the feed rod 17, i.e., between the advanced and retracted positions. More specifically, the completion time of the bolt insertion is defined as the time when a predetermined time elapses after the bolt 10 is actually inserted into the receiving hole 20. Therefore, since the advancement of the movable electrode 6 is started after the holding head 18 of the feed rod 17 is sufficiently returned, the interference of the advanced movable electrode 6 with the holding head 18 can be avoided.

The pushing-out force is exerted by applying an air blast.

As described above, since the pushing-out force is exerted on the projection bolt 10 through the dynamic pressure of the air blast, the projection bolt 10 can be inserted into the receiving hole at a high speed. This is effective for the reduction in operation time.

The timer unit 61 provided starts time measurement when the feed rod 17 reaches the advanced position. The advancement of the air cylinder 21 is stopped in response to the blast-starting signal from the timer unit 61, and an air blast is applied from the holding head 18 to the projection bolt 10 with the end portion of the projection bolt 10 inserted into the receiving hole 20.

The time measurement of the timer unit 61 is started when the feed rod 17 reaches the advanced position. When the elapsed time measured by the timer unit 61 reaches a predetermine value, the blast-starting signal is generated. The advancement of the air cylinder 21 is stopped in response to the blast-starting signal, and only the predetermined length S3 of the end portion of the bolt is inserted into the receiving hole 20. At the same time with the insertion, an air blast is applied to complete the feeding of the bolt to the movable electrode 6.

The advancing speed of the air cylinder 21 serving as the insertion driving means can be accurately set to a predetermined value by controlling the supply of the actuating air. In such a situation, the blast-starting signal is sent after the expiration of the predetermined time required to insert the end portion of the bolt held at the advanced position of the feed rod 17 into the receiving hole 20. Therefore, the insertion position is accurately set, and the air blast is subsequently applied at predetermined timing, whereby the insertion is reliably completed.

In other words, since the timer unit 61 is activated when the feed rod 17 is located at the advanced position, the time until the application of the air blast is appropriately set. Specifically, since the time measurement is started after the bolt 10 held by the feed rod 17 is moved to the standby position, the time until the application of the air blast is easily set.

Accordingly, the bolt 10 can be easily and accurately moved a short distance at a fast speed, and the adverse effects of the above-described mechanically movable sensor parts such as limit switches can be avoided.

A welding apparatus according to one embodiment comprises: the electric resistance welding mechanism 100 including the air cylinder 5 serving as the advancing pressurizing means and the movable electrode 6 that is advanced-retracted along the electrode axis line O-O by the air cylinder 5, with the receiving hole 20 formed in the movable electrode 6 so as to be coaxial with the electrode axis line O-O, a bolt 10 inserted into the receiving hole 20 being to be welded to the steel plate part 30; the welding part-feeding mechanism 101 including the feed rod 17, the air cylinder 16 for advancing and retracting the feed rod 17 holding the bolt 10 toward and from the electrode axis line O-O, and the air cylinder 21 serving as the insertion driving means for inserting the bolt 10 held by the feed rod 17 into the receiving hole 20; the steel plate part moving mechanism 102 for inserting the steel plate part 30 between the electrodes 6 and 7 and moving the steel plate part 30 to a position at which the bolt 10 is to be welded; and the control unit 103 for operating the electric resistance welding mechanism 100, the welding part-feeding mechanism 101, and the steel plate part moving mechanism 102. In the welding apparatus, the control unit 103 outputs an actuating signal for the air cylinder 5 in response to at least a signal indicating completion of bolt insertion into the receiving hole 20 and a signal indicating completion of movement of the steel plate part, and the advancement of the movable electrode 6 in the retracted state is started in response to the actuating signal.

The feed rod 17 holding the bolt 10 is advanced toward the electrode axis line O-O by the air cylinder 16 and stopped when the bolt 10 and the receiving hole 20 are coaxial with each other. Subsequently, the air cylinder 21 is actuated to insert the bolt 10 into the receiving hole 20, and a signal indicating the completion of the insertion is inputted to the control unit 103. After completion of the insertion into the receiving hole 20, the feed rod 17 is retracted by the air cylinder 16.

The steel plate part moving mechanism 102 is actuated at the same time with the action of feeding the bolt by the feed rod 17, and the bolt welding point on the steel plate part 30 is thereby aligned with the electrodes. The signal indicating the completion of the alignment is inputted to the control unit 103.

As described above, the insertion completion signal and the alignment completion signal are inputted to the control unit 103, and an AND operation is performed on these signals, whereby the actuating signal for the air cylinder 5 is outputted. The advancement of the movable electrode 6 in the retracted state is started in response to the actuating signal.

Therefore, the operation effects that are the same as those described in the embodiment of the welding method can be obtained.

The timer unit 61 provided starts time measurement when the feed rod 17 reaches the advanced position. This timer unit 61 generates the blast-starting signal for setting the start timing of the application of an air blast, and the blast-starting signal is also used to stop the advancement of the air cylinder 21.

When the feed rod 17 reaches the advanced position, the timer unit 61 starts the time measurement. When the elapsed time measured by the timer unit 61 reaches a predetermine value, the blast-starting signal is generated. The advancement of the air cylinder 21 serving as the insertion driving means is stopped in response to the blast-starting signal, and only the predetermined length S3 of the end portion of the bolt is inserted into the receiving hole 20. At the same time with the insertion, an air blast is applied to complete the feeding of the bolt to the movable electrode 6.

The advancing speed of the air cylinder 21 can be accurately set by controlling the supply of the actuating air. In such a situation, the blast-starting signal is sent after the time required to insert the end portion of the projection bolt held at the advanced position of the feed rod 17 into the receiving hole 20 expires. Therefore, the insertion position is accurately set, and the air blast is subsequently applied at predetermined timing, whereby the insertion is reliably completed.

In other words, since the timer unit 61 is activated when the feed rod 17 is located at the advanced position, the time until the application of the air blast is appropriately set. Specifically, since the time measurement is started after the bolt 10 held by the feed rod 17 is moved to the standby position, the time until the application of the air blast is easily set.

Accordingly, the bolt 10 can be easily and accurately moved a short distance at a fast speed, and the adverse effects of the above-described mechanically movable sensor parts such as limit switches can be avoided.

After completion of the insertion of the projection bolt 10 into the receiving hole 20 by the application of the air blast, the timer unit 61 generates the retraction-starting signal for starting the action of retracting the air cylinder 21.

The advancement of the air cylinder 21 serving as the insertion driving means is stopped at a position at which the end portion of the projection bolt is inserted into the receiving hole 20 to the predetermined length S3. Upon completion of the insertion of the bolt 10 by the application of the air blast, the timer unit 61 generates the retraction-starting signal for retracting the holding head 18 held at the stop position. Therefore, the holding head 18 is reliably retracted in response to the retraction-starting signal generated after the expiration of a predetermined time measured by the timer unit 61. In this manner, the action of returning the holding head 18 after the application of the air blast is reliably carried out, and therefore, reliable operation can be ensured.

After completion of the retraction of the air cylinder 21, the timer unit 61 generates the return-starting signal for returning the feed rod 17 to the retracted position.

Since the return-starting signal is generated after the air cylinder 21 is retracted, the action of returning the feed rod 17 is carried out subsequently to the retraction of the air cylinder 21. Therefore, the action of returning the feed rod 17 is performed successively after the retraction of the air cylinder 21. Accordingly, the retraction of the air cylinder 21 and the action of returning the feed rod 17 are accurately performed in a continuous manner, and therefore the operational reliability of the apparatus is improved.

A pushing-out force of an air blast is applied to the bolt 10 inserted into the receiving hole 20 by the air cylinder 21 to complete the insertion into the receiving hole 20. The application of the air blast may be continued until a midway point on the return stroke of the feed rod 17.

If the air pressure of the air blast decreases or foreign objects such as iron chippings enter the holding head, the projection bolt held by the holding head may not be introduced into the receiving hole by the pushing-out force of the air blast. When such a phenomenon occurs, the projection bolt remains held by the holding head during the action of returning the feed rod, and the so-called "bolt bringing back phenomenon" occurs. Accordingly, the pushing-out action of the pushing-out force is continued until the holding head returns to the midway point on the return stroke, as described above. In this manner, the projection bolt remaining on the holding head is blown off and removed by the air blast during the returning action to prevent damage to the holding head caused by the projection bolt. Specifically, the collision of the returning bolt 10 with the feed tube 57 is prevented.

The stopper unit 29 is of a type in which the projection bolt 10 transferred through the feed hose 28 by an air blast is temporarily stopped by the stopper piece 54 and then the stopper piece 54 is moved to a pass position to allow the projection bolt 10 to pass through the feed tube 57 and be held by the holding head 18 of the feed rod 17. The stopper unit 29 is configured such that the relative positions of the holding head 18 and the feed tube 57 are set such that the position of the holding head 18 appropriately coincides with the position of the feed tube 57 when the feed rod 17 is stopped at the retracted position, and that the stopper piece 54 is moved from the stop position to the pass position in response to a retracted position signal generated by the retracted position sensor 63 when the feed rod 17 is stopped at the retracted position.

The projection bolt 10 transferred through the feed hose 28 by the air blast is temporarily stopped by the stopper piece 54 held in the closed state, so that the impact on the holding head 18 is alleviated. Subsequently, the stopper piece 54 is moved to the pass position in response to the retracted position signal, and the projection bolt 10 reaches the holding head 18.

More specifically, the relative positions of the feed tube 57 and the holding head 18 are set such that the position of the holding head 18 coincides with the position of the feed tube 57 when the feed rod 17 is retracted. As described above, after the feed rod 18 is stopped at the retracted position, the stopper piece 54 is actuated in response to the retracted position signal, and then the stopped projection bolt 10 passes through the stopper piece 54 and is received by the holding head 18. Therefore, when the feed rod 17 is fully returned, the stopper unit 29 is brought into a passing state.

As described above, the retracted position signal is generated when the feed rod 17 is located at the retracted position, and the stopper unit 29 is actuated in response to this signal. Therefore, the projection bolt 10 is fed after the feed rod 17 returns and the position of the feed tube 57 coincides with the position of the holding head 18. Accordingly, the projection bolt 10 is reliably held by the holding head 18, and therefore reliable operation can be obtained.

In particular, as for the relative positions of the feed tube 57 and the holding head 18, if the stop position of the feed rod 17 is displaced even slightly, a phenomenon occurs in which the projection bolt 10 is not normally transferred to the holding head 18. Therefore, the stopper unit 29 must be brought into the passing state under the condition that the operating position of the feed rod 17 is accurately obtained. In this embodiment, this important requirement can be reliably satisfied by the relation with the retracted position of the feed rod 17.

The application of the air blast from the air blast tube 27 to the projection bolt 10 is carried out at substantially the same time as when the feed rod 17 is advanced and the projection bolt 10 arrives at the receiving hole 20.

At substantially the same time with the arrival of the projection bolt at the receiving hole 20, an air blast is applied to the projection bolt 10 in the air hose 28. Specifically, the application of the air blast to the feed passage is carried out at substantially the same time with the feeding of the projection bolt 10 to the receiving hole 20 by the feed rod 17. Therefore, the action of returning the feed rod 17 after completion of feeding and the transfer of the projection bolt 10 to the stopper unit 29 can be carried out at the same time. This is effective for reducing the operation time of the apparatus.

A first projection bolt 10 is transferred to the stopper unit 29 by the air blast described above, and the first projection bolt 10 then arrives at the holding head 18 in response to the retracted position signal of the feed rod 17. Specifically, after the first projection bolt is safely transferred to the holding head 18, a second projection bolt 10 for the next stroke of the feed rod 17 is transferred to the stopper unit 29 by an air blast. Therefore, after the first projection bolt 10 is successfully fed by the advancement of the feed rod 17, the second projection bolt 10 is transferred, so that an accurate and stable feeding cycle can be obtained. This improves the operation reliability of the apparatus.

Embodiment 2

Figure 8:
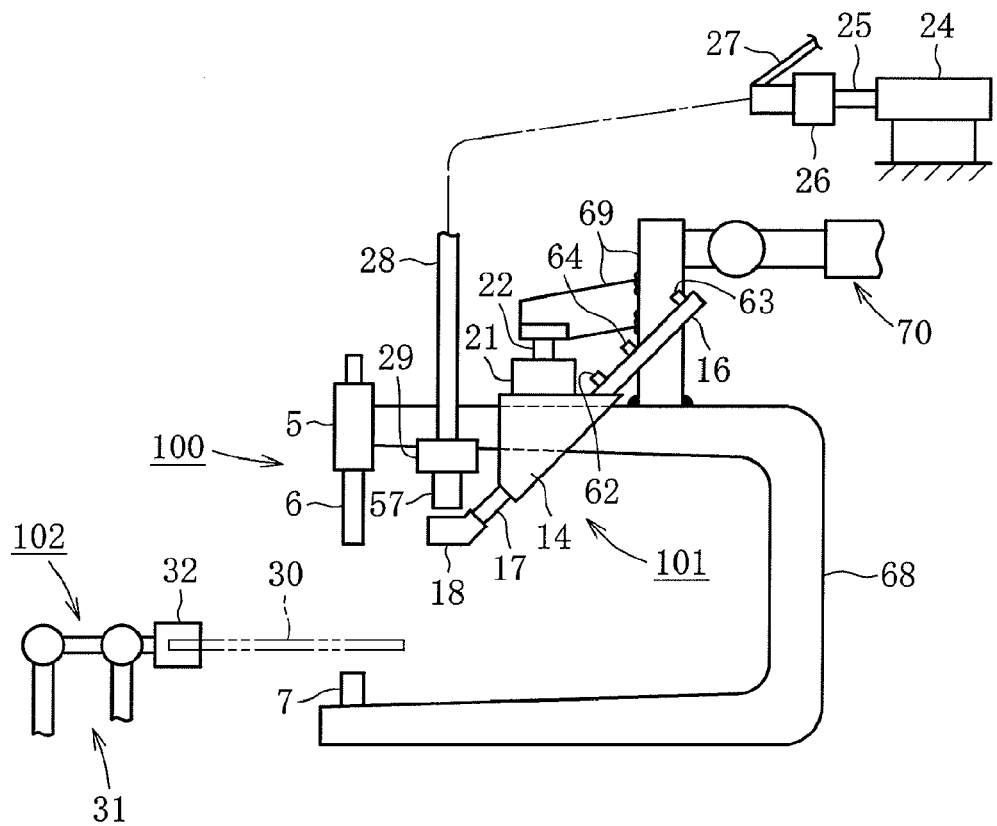
FIG. 8 is a side view illustrating another embodiment.

FIG. 8 illustrates embodiment 2.

In embodiment 2, the electric resistance welding mechanism 100 used in embodiment 1 is replaced with a mechanism of a C-gun type. Specifically, a connection member 69 is secured to a C-shaped arm 68, and the piston rod 22 of the air cylinder 21 is secured to the connection member 69. The base 14 as described above is connected to the air cylinder 21. Moreover, another robot device 70 is connected to the connection member 69. The rest of the configuration, including parts not shown in the figure, is the same as that of embodiment 1, and the same reference numerals denote components having similar functions. The operation effects are the same as those of embodiment 1.

Embodiment 3

Figure 9:
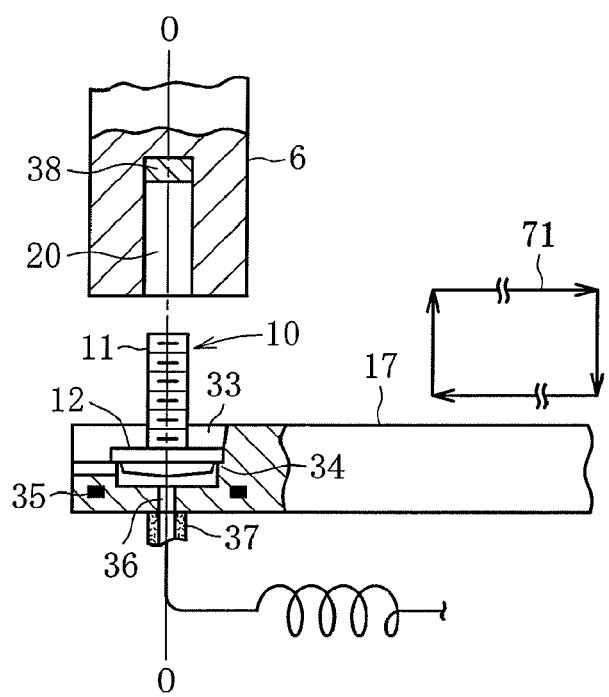
FIG. 9 is a vertical side cross-sectional view illustrating yet another embodiment.

FIG. 9 illustrates embodiment 3.

In the preceding embodiments, the feed rod 17 is advanced and retracted obliquely relative to the electrode axis line O-O. However, in embodiment 3, the feed rod 17 is advanced and retracted in a direction orthogonal to the electrode axis line O-O. The feed rod 17 is raised by the air cylinder 21, and the end portion of the shaft portion 11 is inserted into the receiving hole 20. Subsequently, an air blast is applied to complete the insertion of the bolt 10. After completion of the insertion, the feed rod 17 is not lowered, and the feed rod 17 in a raised state is retracted. Specifically, the feed rod 17 moves along a square-shaped path represented by reference numeral 71.

Therefore, in embodiment 3, after the bolt 10 is inserted into the receiving hole 20 by the application of an air blast, the feed rod 17 is retracted by the air cylinder 16 without changing its position. When the feed rod 17 is moved in the above manner, the action of lowering the feed rod 17 in response to the retraction-starting signal is not performed. The rest of the configuration, including parts not shown in the figure, is the same as that of the preceding embodiments, and the same reference numerals denote components having similar functions. The operation effects are the same as those of the preceding embodiments.

Embodiment 4

FIGS. 10 and 11 illustrate embodiment 4.

In the preceding embodiments, after the end portion of the bolt 10 is inserted into the receiving hole 20, an air blast is applied to the bolt held in the insertion position to complete the insertion of the bolt. In embodiment 4, a pushing-out member is used instead of the air blast.

A description will be given of the structure shown in FIG. 10. The holding head 18 is attached to one end portion of the feed rod 17. The holding head 18 includes a head body 80 having a holding recess 33 for holding a bolt 10. A pushing-out member 82 is disposed piercing the head body 80 with the pushing-out member 82 being projected from a bottom portion 81 of the holding recess 33 to push out the bolt 10 held in the holding recess 33. Reciprocating means, i.e., an air cylinder 83, for advancing and retracting the pushing-out member 82 is attached to the head body 80.

The holding recess 33 corresponds to the receiving hole 33 in the preceding embodiments. The air cylinder 83 is welded or bolted to the head body 80. The piston rod of the air cylinder 83 serves as the pushing-out member 82, and the pushing-out member 82 is a so-called push rod. The projection bolt 10 is pushed out of the holding recess 33 by the pushing-out force of the push rod. A compression coil spring 85 is inserted between a piston 84 of the air cylinder 83 and the inner end surface of the air cylinder 83 and urges the pushing-out member 82 in its retraction direction. A member for forming an air passage, i.e., an air hose 86, is attached to supply compressed air from the air passage 36 of the feed rod 17 to the lower portion of the piston 84. Since the compression coil spring 85 is used, actuating air is supplied only to the lower portion of the piston 84 to advance the pushing-out member 82, and the spring force of the compression coil spring 85 causes the pushing-out member 82 to retract. Accordingly, the air piping can be simplified.

A recessed portion 87 having a shape corresponding to the outer shape of the welding projection 13 is provided in the end surface of the pushing-out member 82. Since the shape of the welding projection 13 corresponds to the shape of the recessed portion 87, the relative positions of the pushing-out member 82 and the bolt 10 at the time of the advancement of the pushing-out member 82 are correctly maintained.

In the structure shown in FIG. 11, a cup-shaped member is welded to the upper surface of the head body 80, and the holding recess 33 is provided in this member. This structure is the same as that shown in FIG. 10 except for the above.

In embodiment 4, the air cylinder 83 is used as the reciprocating means. However, instead of the air cylinder, any of an advancing-retracting output-type electric motor and an electromagnetic solenoid may be used. The rest of the configuration, including parts not shown in the figure, is the same as that of the preceding embodiments, and the same reference numerals denote components having similar functions.

After the end portion of the shaft portion 11 is inserted to an insertion length S3 with the air cylinder 21, actuating air is supplied to the air cylinder 83. Then, the pushing-out member 82 is raised to push the bolt 10 out, and the insertion of the bolt into the receiving hole 20 is completed.

The operation control state in embodiment 4 is described below in the same manner as in embodiment 1. Note that the "blast-starting signal" in FIG. 5B is replaced with an "advancement-starting signal."

In the state shown in FIG. 5A, the feed rod 17 is located at the retracted position, and therefore the signal from the retracted position sensor 63 is inputted to the control unit 103. An actuating signal thereby generated is sent to the air switching valve 60. Then, actuating air is supplied from the air switching valve 60 to the air cylinder 55 of the stopper unit 29, and the stopper piece 54 is moved from the stop position to the pass position, whereby the bolt 10 held in the standby position shown by the long dashed double-short dashed line in FIG. 4 drops into the holding head 18 and placed on the step portion 34. After the bolt 10 passes through the stopper piece 54, the stopper piece 54 immediately returns to the original stop position by the action of the air switching valve 60.

In the above state, a startup signal is outputted from the control unit 103, and actuating air is supplied from the air switching valve 60 to the air cylinder 16. Then, the feed rod 17 is advanced, and the advancement of the feed rod 17 is stopped in response to the detection signal from the advanced position sensor 62 (see FIG. 6A). More specifically, the signal from the advanced position sensor 62 is inputted to the control unit 103, and the air switching valve 60 is thereby actuated to stop the advancement of the air cylinder 16. In this state, the shaft portion 11 is coaxial with the receiving hole 20 as shown in FIG. 2A.

Actuating air is supplied to the air cylinder 21 serving as the insertion driving means in response to the detection signal from the advanced position sensor 62, i.e., the "feed rod advanced position signal" shown in FIG. 5B, and the bolt 10 held by the holding head 18 is thereby raised. Upon the start of the raising action of the air cylinder 21, the timer unit 61 starts time measurement in response to the "feed rod advanced position signal."

An advancement-starting signal is sent from the timer unit 61 to the control unit 103 when 0.3 seconds elapse after the timer unit 61 starts the time measurement, whereby the raising of the air cylinder 21 is stopped (see FIG. 6B). This stop position is located at a position at which the end portion of the shaft portion 11 is inserted at the distance S3, i.e., a position of 3 mm into the receiving hole 20. At the same time with the raising of the air cylinder 21 is stopped, the air from the air switching valve 60 is supplied from the air passage 36 through the air hose 37 to the air cylinder 83. The pushing-out member 82 is thereby advanced to push the bolt 10 out of the holding recess 33, and the bolt 10 enters the receiving hole 20 against the attractive force of the permanent magnet 35. The upper surface of the flange portion 12 comes into intimate contact with the end surface of the movable electrode 6, and the flange portion 12 is stopped (see FIG. 6C). This stop position is maintained by the attractive force of the permanent magnet 38. When the pushing-out member 82 is pushed out, the shaft portion 11 is inserted at a position of 3 mm into the receiving hole 20. Therefore, the shaft portion 11 is smoothly enters the receiving hole 20 at a high speed without any deviation.

To stop the shaft portion 11 such that its end is inserted to a length of 3 mm as described above, the advancing speed of the air cylinder 21 is set such that the shaft portion 11 moves 20 mm, which is the total length of the spacing S2 and the distance S3, in 0.3 seconds. This advancing speed is set by the supply rate of air from the air switching valve 60. The air supply rate is set by controlling the air switching valve 60 in response to the signal from the control unit 103. Alternatively, the speed may be adjusted by an air throttle valve (speed control valve) attached to the air cylinder 21. In other words, by setting the measured time to 0.3 seconds, the shaft portion 11 can be stopped accurately at a position at which it is inserted to a length of 3 mm. The accurate stop position can be ensured because the raising speed of the air cylinder 21 can be set accurately. Therefore, fine control of the stop of the insertion of the shaft portion 11 at a position at which its end is inserted to a length of 3 mm followed by the advancement of the pushing-out member 82 is accurately achieved by the time count of the timer unit 61. Instead of the above air cylinder 21, an advancing-retracting output-type electric motor provided with a pulse encoder may be used.

The period of time when the holding head 18 is raised to the pushing-out position of the pushing-out member 82 is 0.2 seconds until 0.5 seconds elapse after the start of the time measurement. The pushing-out member 82 is advanced within the time period of 0.2 seconds, and a pushing-out force is applied to the bolt 10. The time required to complete the insertion of the bolt 10 into the receiving hole by the advancement of the pushing-out member 82 is very short. More specifically, the insertion of the bolt 10 by the advancement of the pushing-out member 82 is completed within a time period of much less than 0.2 seconds. It is difficult to measure the time required to complete the insertion because the bolt 10 moves a short distance at a fast speed, but the time required to complete the insertion may be 0.01 seconds to 0.03 seconds. Therefore, the insertion of the bolt 10 by the advancement of the pushing-out member 82 can be reliably completed within an ample time period of 0.2 seconds.

The above time values of 0.01 seconds to 0.03 seconds are determined by the cylinder inner diameter of the air cylinder 83 and the air passage area, air pressure, and other factors of each of the components such as the air passage 36.

Subsequently, when 0.5 seconds elapse after the start of the time measurement by the timer unit 61, the retraction-starting signal is sent from the timer unit 61. The air cylinder 21 is lowered in response to the retraction-starting signal, and the holding head 18 returns to a position immediately below the movable electrode 6, i.e., the position shown in FIG. 2A (see FIG. 6D). The returning distance is 20 mm as described above, and the time required for this distance is estimated to be 0.1 seconds. Therefore, when the returning time is set to 0.2 seconds in the timer unit 61, it is enough for the holding head 18 to return to the position shown in FIG. 6D before 0.7 seconds elapse after the start of the time measurement. This is also advantageous in that the returning action can be reliably preformed within an ample time period.

After the holding head 18 returns to the position shown in FIG. 6D and 0.7 second elapse after the start of the time measurement, the return-starting signal for retracting the feed rod 17 by the air cylinder 16 is sent from the timer unit 61 to the control unit 103. Therefore, the air cylinder 16 returns in response to an actuating signal from the control unit 103, and the feed rod 17 returns to the retracted position.

As described above, the advancement of the pushing-out member 82 is started in response to the advancement-starting signal, and the advanced state is maintained until the feed rod 17 (the holding head 18) returns to the midway point between the advanced position sensor 62 and the retracted position sensor 63. Accordingly, a detection signal from the midway position sensor 64 is sent to the control unit 103, whereby the air switching valve 60 is actuated to stop the air supply to the air cylinder 83. By maintaining the advanced state of the pushing-out member 82 until the holding head 18 returns to the midway point as described above, the holding head 18 is prevented from returning with the bolt 10 remaining thereon. Even if a phenomenon occurs in which the pushing-out member 82 returns with the bolt 10 adhering to its end portion with oil or the like, the bolt 10 is shaken off during the returning action of the feed rod 17 since the pushing-out member 82 is in a projecting state. In this manner, damage to the receiving hole 33 of the holding head 18 caused by a collision of the shaft portion 11 of the bolt 10 with the feed tube 57 can be prevented. Such a so-called "bolt bringing back phenomenon" may occur when the pressure of air supplied to the air cylinder 83 decreases for some reason or foreign objects such as iron chippings enter the receiving hole 33. To prevent the above phenomenon, the holding head 18 is prevented from returning with the bolt 10 remaining thereon. The "bolt bringing back phenomenon" may also occur in the following case. When the pushing-out member 82 is retracted immediately after completion of the insertion of the bolt 10 into the receiving hole 20, the bolt 10 may fall out of the receiving hole 20 for some reason and may be held again by the holding recess 33.

As a signal indicating complete insertion of the bolt 10 into the receiving hole 20, a time measurement signal from the timer unit 61, for example, a signal generated when 0.4 seconds elapse after the start of the time measurement may be used. To allow for a sufficient time margin, the signal used in this embodiment is generated when the feed rod 17 is located at a predetermined position on the return stroke thereof, i.e., by the midway position sensor 64 during the returning action of the feed rod 17. The above predetermined position is set to allow for a distance enough to sufficiently return the holding head 18 by the returning action of the air cylinder 16.

Moreover, as shown in FIG. 5A, the robot device 31 itself includes a robot control unit 66, and signals therefrom cause various movements of the robot device 31. When a welding point on the steel plate part 30 to which the bolt 10 is to be welded is aligned with the fixed electrode 7 during these movements, a signal is generated by the robot control unit 66 and sent to the control unit 103.

An AND operation is performed on the signal indicating complete insertion of the bolt 10 into the receiving hole 20 and the signal generated when the welding point on the steel plate part 30 to which the bolt 10 is to be welded is aligned with the fixed electrode 7, and the advancement of the movable electrode 6 is started. More specifically, after it is confirmed that the bolt 10 is securely held by the movable electrode 6 and that the steel plate part 30 is placed in a suitable position relative to the electrodes, the movable electrode 6 is advanced. When the welding point on the steel plate part 30 to which the bolt 10 is to be welded is first aligned with the fixed electrode 7 and then the function of the returning signal for the feed rod 17 is activated, the returning signal obtained by the midway position sensor 64 during the return stroke is more advantageous in terms of time reduction. If the returning signal obtained by the retracted position sensor 63 is used, an additional time for return stroke from the sensor 64 to the sensor 63 is required.

In the manner described above, the control unit 103 receives at least the completion signal of the bolt insertion into the receiving hole 20 and the completion signal of the movement of the steel plate part 30 and outputs an actuating signal for the air cylinder 5 serving as the advancing pressurizing means. The advancement of the movable electrode 6 held in the retracted state is started in response to the above actuating signal.

The movable electrode 6 is advanced in the manner described above, and the welding projection 13 of the bolt 10 is pressed against the steel plate part 30. Then, a welding current is applied to complete welding.

The above operation may take an operation mode in which the pushing-out member 82 is advanced to release the bolt 10 from the attraction of the permanent magnet 35 and is subsequently attracted by the permanent magnet 38 in the receiving hole 20 to complete the insertion movement of the bolt 10. To achieve this, the attractive force of the permanent magnet 35 is set to be weak, and the attractive force of the permanent magnet 38 is set to be strong. Alternatively, the above operation may take another operation mode in which the pushing-out member 82 is advanced to cause the bolt 10 to be inserted until it reaches the permanent magnet 38 to thereby complete the insertion movement. Specifically, the pushing-in action of the pushing-out member 82 is mainly utilized. To achieve this, the attractive force of the permanent magnet 35 is set to be weak. In addition, the advancing force of the pushing-out member 82 is increased, and the advancing stroke is increased.

The operation effects of embodiment 4 are as follows.

The pushing-out force is exerted by advancing the pushing-out member 82.

The pushing-out member 82 is formed of a rod-like member, and this member 82 pushes out the projection bolt 10 in contact therewith. Therefore, the application of the pushing-out force to the projection bolt 10 is reliably achieved.

The holding head 18 is attached to the end portion of the feed rod 17, and the holding recess 33 for holding the bolt 10 is provided in the head body 80 of the holding head 18. The pushing-out member 82 is disposed piercing the head body 80 and is projected from the bottom portion 81 of the holding recess 33 to push out the bolt 10 held in the holding recess 33. The air cylinder 83 for advancing and retracting the pushing-out member 82 is attached to the head body 80.

Only the pushing-out member 82 is advanced from and retracted into the bottom portion 81 of the holding recess 33 by the air cylinder 83 serving as the reciprocating means and attached to the head body 80. Therefore, the number of advancing-retracting members is minimized, and the space occupied by the advanced pushing-out member 82 is small. Accordingly, the insertion of the bolt can be easily performed even in a narrow area without interference with adjacent components. Specifically, the pushing-out member 82 can be formed of a thin member such as a piston rod, so that the required space can be small. Since the pushing-out member 82 comes into contact with the bolt 10 to insert it into the receiving hole 20, the advancement of the bolt 10 is reliably achieved. Since blasting sound such as the sound of an air blast is not generated, a quiet factory environment can be obtained. Since the air cylinder 83 is actuated with the end portion of the bolt 10 inserted into the receiving hole 20, the insertion length into the receiving hole 20 by the air cylinder 83 can be minimized. Therefore, the size of the air cylinder 83 can be reduced, so that the holding head can be easily advanced into a narrow area. As the reciprocating means, any suitable output unit such as an air cylinder, an advancing-retracting output-type electric motor, or an electromagnetic solenoid may be used according to the form of the apparatus, and therefore a good apparatus can be ensured. Even when the air cylinder 83 is used, the structure in which the repeated deformation of the air hose 86 is avoided can be constructed, so that the above problems such as air leakage do not occur.

In the air blast used in embodiment 1, the application of the air blast is continued until the holding head 18 returns to the midway point on the return stroke, whereby the projection bolt 10 is blown off and removed. However, in embodiment 4, a pushing-out force is applied to the bolt 10 by the pushing-out member 82. In this case, the projecting state of the pushing-out member 82 is maintained until the holding head 18 returns to the midway point on the return stroke, whereby the projection bolt 10 is caused to drop off and removed. Specifically, when the pushing-out member 82 is in a projecting state, the bolt 10 cannot be stably held by the holding head 18. Therefore, the bolt 10 is reliably caused to drop off, so that the "bolt bringing back phenomenon" can be prevented.

The rest of the operation effects are the same as those of the embodiments of the invention according to claim 1 and its dependent claims in which an air blast is utilized.

Embodiment 5

FIG. 12 illustrates embodiment 5.

In the preceding embodiments, the end portion of the bolt 10 is inserted into the receiving hole 20, pushed further into the receiving hole 20 by an air blast, the pushing member, or the like, and then attracted by the permanent magnet 38 disposed on the closed end of the receiving hole 20. Embodiment 5 includes an introducing mechanism for introducing, in the receiving hole 20 in an integral manner, the bolt 10 having the end portion inserted into the receiving hole 20. In one example of the introducing mechanism, an introducing rod 90 is disposed in the receiving hole 20 so as to be capable of advancing and retracting. The most advanced position of the introducing rod 90 is located at a position slightly recessed from the end surface of the movable electrode 6, and the distance S3 described above is defined by this position.

An air cylinder 91 for advancing and retracting the introducing rod 90 is connected to the movable electrode 6. Instead of the air cylinder 91, an advancing-retracting output-type electric motor or an electromagnetic solenoid may be used. The movable electrode 6 is connected to the air cylinder 5 through a connecting member 92.

Figure 12B:
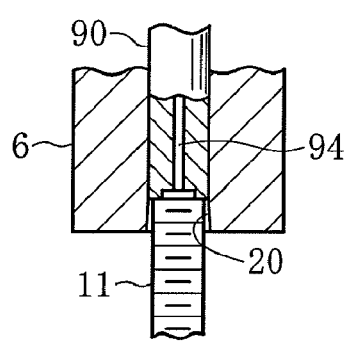
FIG. 12B is a cross-sectional view illustrating a modified embodiment of an introducing rod.
Figure 12A:
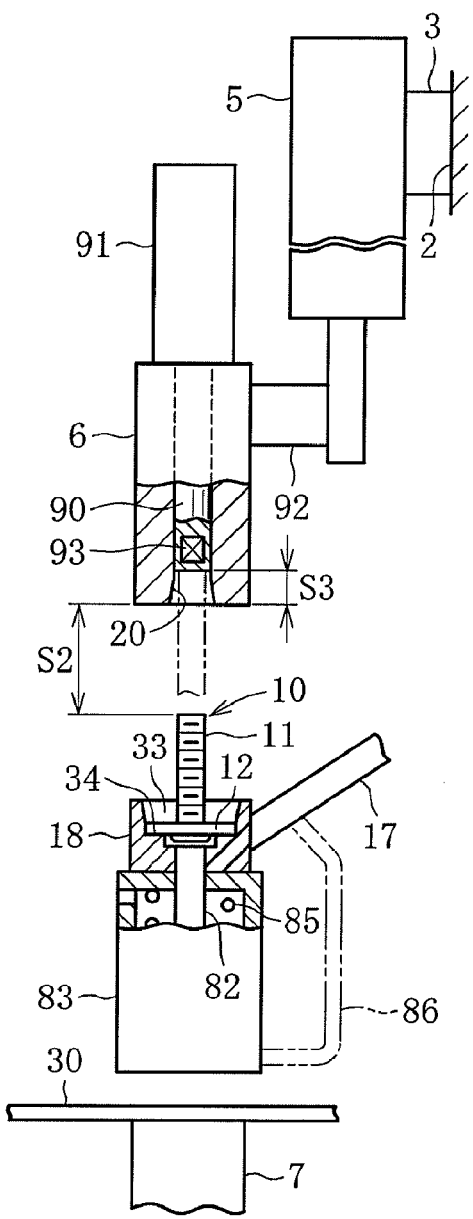
FIG. 12A is a cross-sectional view illustrating another embodiment.
Figure 12C:
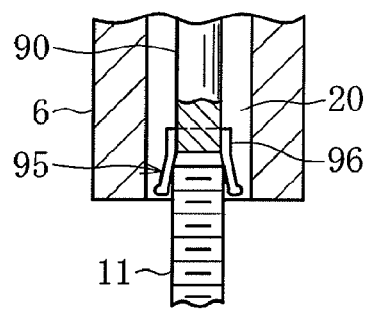
FIG. 12C is a cross-sectional view of another modified embodiment of the introducing rod.

In the introducing mechanism shown in FIG. 12A, a permanent magnet 93 is embedded in the introducing rod 90. FIG. 12B illustrates another introducing mechanism. In this introducing mechanism, the bolt 10 is sucked by a vacuum instead of the permanent magnet 93. Therefore, a suction passage 94 is provided to suck the shaft portion 11 in contact with the lower end surface of the introducing rod 90. The suction passage 94 is connected to a suction pump (not shown). FIG. 12C illustrates yet another introducing mechanism. In this introducing mechanism, a collet chuck 95 is used instead of the permanent magnet 9. The upper portion of a cylindrical collet 96 is connected to the introducing rod 90, and the lower portion is a skirt-shaped elastic portion. The rest of the configuration, including parts not shown in the figure, is the same as that of the preceding embodiments, and the same reference numerals denote components having similar functions.

In the introducing mechanism illustrated in FIG. 12, the bolt 10 is pushed out by the pushing-out member 82. Instead of the pushing-out member 82, an air blast method shown in FIG. 2 may be used.

In the introducing mechanism shown in FIG. 12A, the pushing-out member 82 is advanced to insert the end portion of the shaft portion 11 into the portion S3 of the receiving hole 20. Then, the end of the shaft portion 11 is attracted to the end surface of the introducing rod 90 by the permanent magnet 93. Subsequently, the introducing rod 90 is retracted by the air cylinder 91, and the bolt 10 is introduced further into the receiving hole 20 as the pushing-out member 82 is advanced. In the introducing mechanism shown in FIG. 12B, the shaft portion 11 and the introducing rod 90 are integrated by a vacuum and introduced in the receiving hole 20. In the introducing mechanism shown in FIG. 12C, the shaft portion 11 and the introducing rod 90 are elastically integrated by the collet chuck 95 and introduced in the receiving hole 20.

With the above introducing mechanisms, the bolt 10 is introduced in the receiving hole 20 by the introducing rod 90, so that the bolt is reliably introduced. In particular, since the distance S3 is provided for the standby position of the introducing rod 90, the introduction is started after the shaft portion 11 is inserted into the portion S3. Therefore, the introduction in the receiving hole 20 can be reliably performed without any deviation, and reliable operation can be obtained. The rest of the operation effects are the same as those in the preceding embodiments.

INDUSTRIAL APPLICABILITY

As described above, according to the present invention, the advancement of the electrode can be appropriately started based on the positioning of the welding point on the steel plate part to which the projection bolt is to be welded and on the state of completion of feeding of the projection bolt to the electrode. Therefore, the invention can be used in various industrial fields such as welding processes for vehicle bodies and sheet metal welding processes for household electric appliances.

The invention claimed is:

1. A method of welding a projection bolt, the method comprising: inserting an end portion of a projection bolt held by a holding head of an advancing-retracting feed rod into a receiving hole of an electrode by using an advancing action of an insertion driving unit when the feed rod is located at an advanced position; applying a pushing-out force from the holding head to the projection bolt held at an insertion position to complete insertion of the projection bolt into the receiving hole; retracting the feed rod; advancing the electrode toward a steel plate part on standby; and after said advancing the electrode, welding the projection bolt to the steel plate by carrying out pressurization and energization, wherein said advancing the electrode is performed in response to a signal generated upon the insertion of the projection bolt into the receiving hole and a signal generated when a welding point on the steel sheet part to which the projection bolt is to be welded is aligned with the electrode, wherein the pushing-out force is exerted by applying an air blast, and wherein the pushing-out force is applied to the projection bolt inserted into the receiving hole to complete the insertion of the projection bolt into the receiving hole, and the application of the pushing-out force is continued until the feed rod returns to a midway point on a return stroke thereof.

2. The method of claim 1, wherein an action of inserting the projection bolt into the receiving hole and an action of aligning the welding point with the electrode are performed in an overlapping manner.

3. The method of claim 2, wherein the signal generated upon the insertion of the projection bolt into the receiving hole is a signal obtained when the feed rod is located at a predetermined position on a return stroke of the feed rod.

4. The method of claim 1, wherein the signal generated upon the insertion of the projection bolt into the receiving hole is a signal obtained when the feed rod is located at a predetermined position on a return stroke of the feed rod.

5. The method of claim 1, wherein:
a timer unit is provided which starts time measurement when the feed rod arrives at the advanced position;
advancement of the insertion driving unit is stopped in response to a pushing-out force application-starting signal from the timer unit; and
the projection bolt with the end portion thereof inserted into the receiving hole is advanced by applying the pushing-out force from the holding head.

6. An apparatus for welding a projection bolt, the apparatus comprising:
an electric resistance welding mechanism including a pair of electrodes and an advancing pressurizing device for advancing and retracting one or both of the electrodes along an electrode axis line, one of the electrodes having a receiving hole formed therein, the receiving hole being coaxial with the electrode axis line, and the electric resistance welding mechanism being configured to weld a projection bolt inserted into the receiving hole to a steel plate part;
a welding part-feeding mechanism including a feed rod, an advancing-retracting device for advancing and retracting the feed rod holding the projection bolt toward and away from the electrode axis line, and an insertion driving device for inserting the projection bolt held by the feed rod into the receiving hole;
a steel plate part moving mechanism for inserting the steel plate part between the pair of electrodes and moving a welding point for the projection bolt toward the electrodes; and
a control unit for operating the electric resistance welding mechanism, the welding part-feeding mechanism, and the steel plate part moving mechanism,
wherein the control unit outputs an actuating signal for the advancing pressurizing device in response to at least a signal indicating completion of insertion of the projection bolt into the receiving hole and a signal indicating completion of movement of the steel plate part, and advancement of the electrodes held in a retracted state is started in response to the actuating signal.

7. The apparatus of claim 6, wherein:
the feed rod includes a holding head attached to an end portion thereof; the holding head includes a head body having a holding recess for holding the projection bolt;
a pushing-out member is disposed piercing the head body and is projected from a bottom portion of the holding recess to push out the projection bolt held in the holding recess; and
a reciprocating device for advancing and retracting the pushing-out member is attached to the head body.

8. The apparatus of claim 6, comprising a timer unit that starts time measurement when the feed rod arrives at an advanced position, the timer unit generating a signal that sets timing of starting application of a pushing-out force for inserting the projection bolt into the receiving hole, and the signal also serves as a signal for stopping advancement of the insertion driving device.

9. The apparatus of claim 6, further comprising a timer unit, wherein the timer unit generates, after completion of the insertion of the projection bolt into the receiving hole, a retraction-starting signal that causes the insertion driving device to perform a retracting action.

10. The apparatus of claim 6, further comprising a timer unit,
wherein the timer unit generates, after completion of retraction of the insertion driving device, a return-starting signal for returning the feed rod to a retracted position.

11. The apparatus of claim 6, wherein a pushing-out force is further applied to the projection bolt inserted into the receiving hole to complete the insertion of the projection bolt into the receiving hole, and the application of the pushing-out force is continued until the feed rod returns to a midway point on a return stroke thereof.

12. The apparatus of claim 6, further comprising a stopper unit in which the projection bolt transferred through a feed passage by an air blast is temporarily stopped by a stopper piece and then the stopper piece is moved to a pass position to allow the projection bolt to pass through a feed tube and be held by the holding head of the feed rod, wherein relative positions of the holding head and the feed tube are set such that the position of the holding head appropriately coincides with the position of the feed tube when the feed rod is stopped at a retracted position, and wherein the stopper piece is moved from a stop position to the pass position in response to a refracted position signal generated when the feed rod is stopped at the retracted position.

13. The apparatus of claim 12, wherein application of the air blast to the projection bolt is carried out at substantially the same time as when the feed rod is advanced and a projection bolt arrives at a target place.

14. A method of welding a projection bolt, the method comprising: inserting an end portion of a projection bolt held by a holding head of an advancing-retracting feed rod into a receiving hole of an electrode by using an advancing action of an insertion driving unit when the feed rod is located at an advanced position; applying a pushing-out force from the holding head to the projection bolt held at an insertion position to complete insertion of the projection bolt into the receiving hole; retracting the feed rod; advancing the electrode toward a steel plate part on standby; and after said advancing the electrode, welding the projection bolt to the steel plate by carrying out pressurization and energization, wherein said advancing the electrode is performed in response to a signal generated upon the insertion of the projection bolt into the receiving hole and a signal generated when a welding point on the steel sheet part to which the projection bolt is to be welded is aligned with the electrode, wherein a timer unit is provided which starts time measurement when the feed rod arrives at the advanced position, wherein advancement of the insertion driving unit is stopped in response to a pushing-out force application-starting signal from the timer unit, and wherein the projection bolt with the end portion thereof inserted into the receiving hole is advanced by applying the pushing-out force from the holding head.

15. The method of claim 14, wherein an action of inserting the projection bolt into the receiving hole and an action of aligning the welding point with the electrode are performed in an overlapping manner.

16. The method of claim 15, wherein the signal generated upon the insertion of the projection bolt into the receiving hole is a signal obtained when the feed rod is located at a predetermined position on a return stroke of the feed rod.

17. The method of claim 14, wherein the signal generated upon the insertion of the projection bolt into the receiving hole is a signal obtained when the feed rod is located at a predetermined position on a return stroke of the feed rod.

* * * * *